(12) United States Patent
Cooper et al.

(10) Patent No.: US 10,820,658 B2
(45) Date of Patent: Nov. 3, 2020

(54) SOLE STRUCTURE FOR AN ARTICLE OF FOOTWEAR WITH ABRASION RESISTANT OUTSOLE AND METHOD OF MANUFACTURING SAME

(71) Applicant: NIKE, Inc., Beaverton, OR (US)

(72) Inventors: Aaron A. C. Cooper, Portland, OR (US); Michael H C Hui, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 284 days.

(21) Appl. No.: 15/897,269

(22) Filed: Feb. 15, 2018

(65) Prior Publication Data

US 2018/0168285 A1  Jun. 21, 2018

Related U.S. Application Data

(62) Division of application No. 14/141,996, filed on Dec. 27, 2013, now Pat. No. 9,930,929.

(51) Int. Cl.
| | | |
|---|---|---|
| *A43B 13/22* | (2006.01) | |
| *A43B 13/12* | (2006.01) | |
| *A43B 13/18* | (2006.01) | |
| *B29D 35/14* | (2010.01) | |

(52) U.S. Cl.
CPC .......... *A43B 13/223* (2013.01); *A43B 13/122* (2013.01); *A43B 13/181* (2013.01); *A43B 13/187* (2013.01); *B29D 35/142* (2013.01)

(58) Field of Classification Search
CPC ..... A43B 13/181; A43B 13/122; A43B 13/22; A43B 13/226; A43B 13/14

USPC ........................................ 36/30 R, 103, 25 R
See application file for complete search history.

(56) References Cited

U.S. PATENT DOCUMENTS

| | | | |
|---|---|---|---|
| 4,498,251 A * | 2/1985 | Shin ......................... | A43B 5/06 36/30 R |
| 5,367,792 A | 11/1994 | Richard et al. | |
| D570,582 S * | 6/2008 | Roy .............................. | D2/953 |
| 9,301,566 B2 * | 4/2016 | Dojan ................. | A43B 13/125 |
| 2005/0060914 A1 * | 3/2005 | Fuerst .................... | A43B 7/141 36/102 |
| 2011/0167672 A1 * | 7/2011 | Bond .................... | A43B 13/223 36/28 |
| 2012/0124865 A1 * | 5/2012 | Opie ........................ | A43B 3/18 36/73 |

(Continued)

FOREIGN PATENT DOCUMENTS

CN            201341510 Y     11/2009

*Primary Examiner* — Timothy K Trieu
(74) *Attorney, Agent, or Firm* — Quinn IP Law

(57) ABSTRACT

A sole structure for an article of footwear includes an outsole that has a body with a lateral side and a medial side, and has a plurality of tread elements extending from the body to establish a ground contact surface. At least some of the tread elements extend between the lateral side and the medial side and each include a front face, a rear face, and a bottom face that connects the front face and the rear face. The bottom face of each of the at least two of the tread elements has a width between the front face and the rear face that varies between the lateral side and the medial side forming different shapes of the tread elements. A method of manufacturing a sole structure for an article of footwear includes forming an outsole with such nonlinear tread elements.

15 Claims, 20 Drawing Sheets

(56) References Cited

U.S. PATENT DOCUMENTS

| | | | | |
|---|---|---|---|---|
| 2013/0047474 A1* | 2/2013 | Healy | ............... | A43B 13/122 36/30 R |
| 2014/0026438 A1* | 1/2014 | Cortez | ............... | A43B 13/184 36/28 |
| 2014/0259744 A1* | 9/2014 | Cooper | ............... | A43B 13/122 36/28 |

* cited by examiner

SOLE STRUCTURE FOR AN ARTICLE OF FOOTWEAR WITH ABRASION RESISTANT OUTSOLE AND METHOD OF MANUFACTURING SAME

CROSS-REFERENCE TO RELATED APPLICATIONS

This application is a divisional application of, and claims priority to, U.S. Ser. No. 14/141,996, filed on Dec. 27, 2013, the entire disclosure of which is incorporated by reference herein.

TECHNICAL FIELD

The present teachings generally include a sole structure for an article of footwear, and a method of manufacturing a sole structure for an article of footwear.

BACKGROUND

Footwear typically includes a sole configured to be located under a wearer's foot to space the foot away from the ground or floor surface. Soles can be designed to provide a desired level of cushioning. Athletic footwear in particular sometimes utilizes polyurethane foam or other resilient materials in the sole to provide cushioning. The ground contact surface of the article of footwear can be configured for durability. For example, an outsole of a durable material, such as rubber, is sometimes provided at the ground contact surface of the article of footwear.

SUMMARY

An article of footwear has a sole structure that includes an outsole. The outsole has a body with a lateral side and a medial side, and a plurality of tread elements extending from the body to establish a ground contact surface. At least some of the tread elements extend between the lateral side and the medial side and each include a front face, a rear face, and a bottom face that connects the front face and the rear face. The bottom face has a width between the front face and the rear face that varies between the lateral side and the medial side at least partially in correspondence with a predetermined wear pattern. By designing the outsole with the widths of the tread elements based on the wear pattern, the outsole is configured to have greater durability in the areas where most required.

The present disclosure also describes a sole structure for an article of footwear. The sole structure includes an outsole having a body with a lateral side and a medial side. The outsole further includes a plurality of tread elements extending from the body to establish a ground contact surface. At least two of the tread elements extend between the lateral side and the medial side. Each of the tread elements include a front face, a rear face, and a bottom face that connects the front face and the rear face. The bottom face of each of the two of the tread elements has a width between the front face and the rear face that varies between the lateral side and the medial side forming different shapes of tread elements.

In one aspect of the present teachings, at least some of the tread elements have an unvarying height, so that different portions of each tread element between the lateral side and the medial side have a substantially identical. Thus, due to the varying width of the tread elements, a greater amount of outsole material is thus provided at portions of the tread elements that are subject to the greatest wear, increasing the abrasion resistance of the outsole. In some embodiments, the tread elements extend from the lateral side to the medial side in a nonlinear manner, such as a zig-zag manner to establish a herringbone tread pattern.

In another aspect of the present teachings a sole structure for an article of footwear includes an outsole that has a body with a lateral side and a medial side. A plurality of tread elements extend from the body. At least some of the tread elements extend between the lateral side and the medial side and each include a front face, a rear face, and a bottom face that connects the front face and the rear face. The body has a height above at least some of the tread elements that varies at least partially in correspondence with a predetermined wear pattern.

In another aspect of the present teachings, a sole structure for an article of footwear includes a midsole assembly that has a resilient component with a lower surface, a heel region, a lateral side, and a medial side. An outsole is attached to the lower surface of the resilient component. The resilient component has a peripheral surface that extends around the heel region and along the lateral side and the medial side. The peripheral surface has a first set of alternating ridges and grooves extending longitudinally forward from the heel region to a first set of tapered ends. The resilient component has a second set of alternating ridges and grooves interleaved with the first set of alternating ridges and grooves and extending longitudinally rearward to a second set of tapered ends rearward of the first set of tapered ends.

A method of manufacturing an article of footwear includes forming an outsole so that at least some tread elements of the outsole extend from a lateral side to a medial side of the outsole, and so that different portions of bottom faces of the tread elements at a ground contact surface of the outsole have different widths, different portions of a body of the outsole from which the tread elements extend have different heights, or both. The different widths of the different portions of the bottom faces and/or the different heights of the body portions are correlated with a predetermined wear pattern having at least one relatively high wear region and at least one relatively low wear region. Because the widths of the tread elements and/or the heights of the body portions correlate with the wear zones, the outsole may exhibit greater durability and abrasion resistance.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items.

Those having ordinary skill in the art will recognize that terms such as "above," "below," "upward," "downward," "top," "bottom," etc., are used descriptively for the figures, and do not represent limitations on the scope of the invention, as defined by the claims.

The above features and advantages and other features and advantages of the present teachings are readily apparent from the following detailed description of the best modes for carrying out the present teachings when taken in connection with the accompanying drawings.

DETAILED DESCRIPTION

Figure 1:
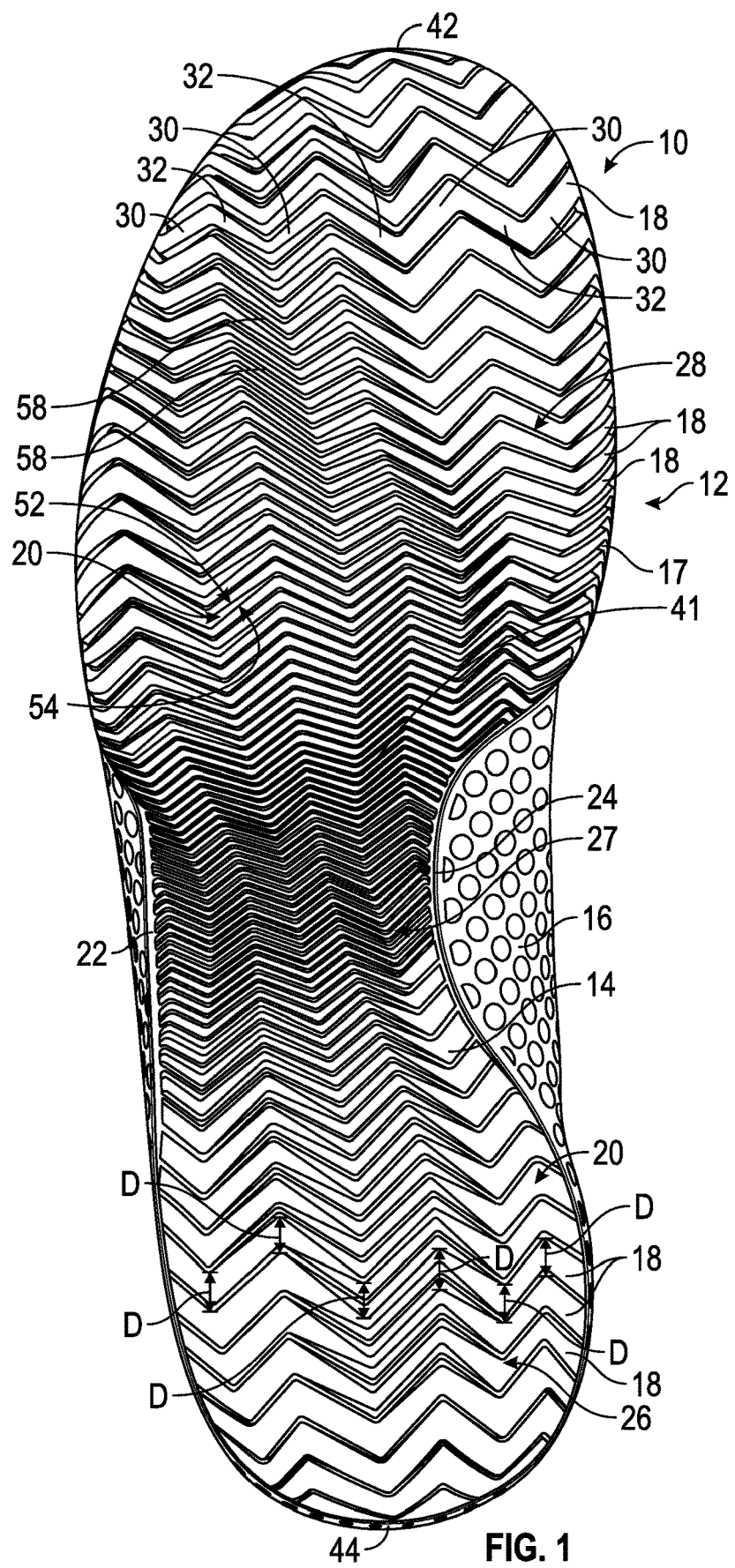
FIG. 1 is a schematic bottom view illustration of a sole structure for an article of footwear having an outsole.
Figure 4:
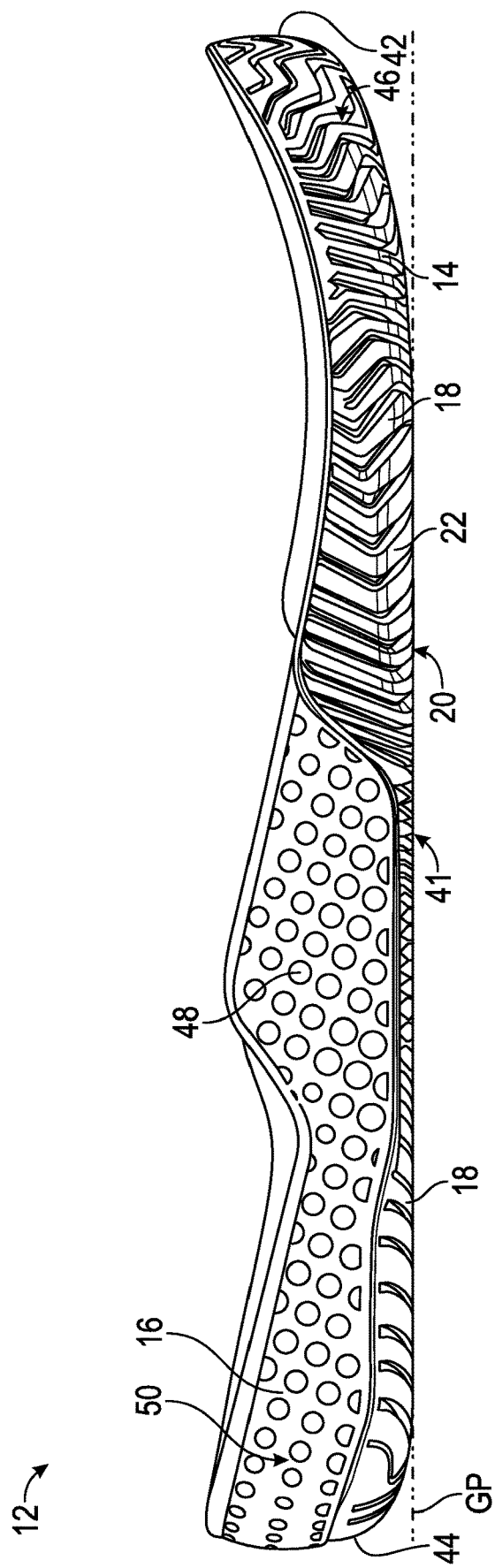
FIG. 4 is a schematic illustration in another side view showing a lateral side of the sole structure of FIGS. 1 and 2.
Figure 7:
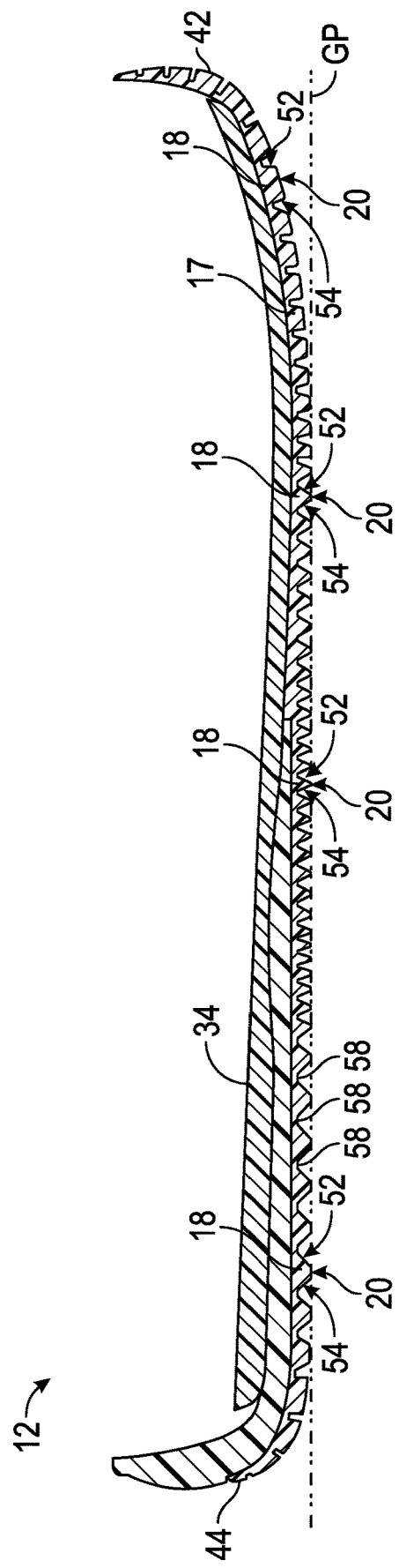
FIG. 7 is a schematic illustration in cross-sectional view of the sole structure of FIGS. 1 and 2 taken at lines 7-7 in FIG. 2.
Figure 8:
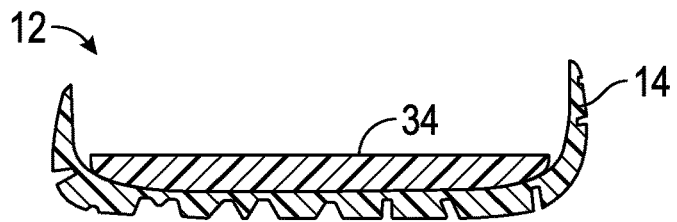
FIG. 8 is a schematic illustration in cross-sectional view of the sole structure of FIGS. 1 and 2 taken at lines 8-8 in FIG. 2.
Figure 9:
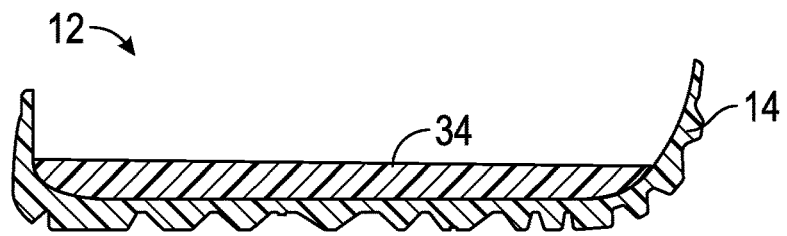
FIG. 9 is a schematic illustration in cross-sectional view of the sole structure of FIGS. 1 and 2 taken at lines 9-9 in FIG. 2.
Figure 10:
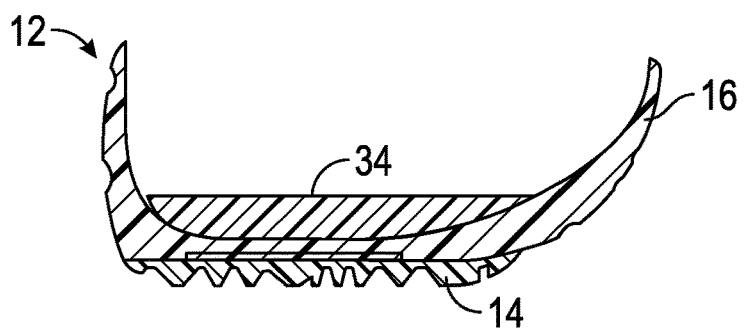
FIG. 10 is a schematic illustration in cross-sectional view of the sole structure of FIGS. 1 and 2 taken at lines 10-10 in FIG. 2.
Figure 11:
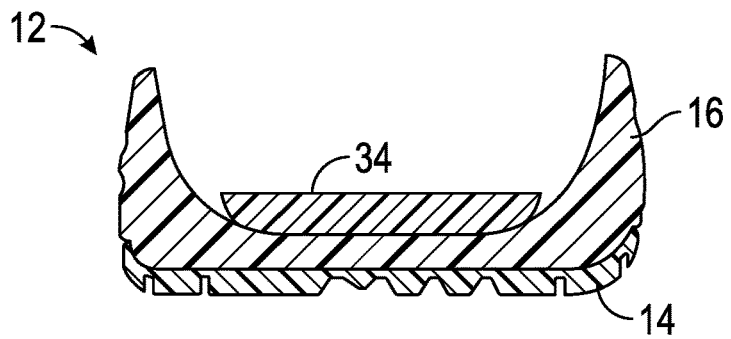
FIG. 11 is a schematic illustration in cross-sectional view of the sole structure of FIGS. 1 and 2 taken at lines 11-11 in FIG. 2.

Referring to the drawings, wherein like reference numbers refer to like components throughout the views, FIG. 1 shows an article of footwear 10 that has a sole structure 12 with an outsole 14. The sole structure 12 also has a first midsole component 16 secured to the outsole 14. As further discussed herein, the outsole 14 has a body 17 with tread elements 18 that extend from the body 17 to establish a ground contact surface corresponding with a predetermined wear pattern 19 of the article of footwear 10, shown in FIG. 12. Specifically, bottom faces 20 of each of the tread elements 18 have a respective width that varies from a lateral side 22 to a medial side 24 of the outsole 14 so that the width is greater in relatively high wear areas than in relatively low wear areas. The ground contact surface of the outsole 14 is the total surface of the bottom faces 20 of all of the tread elements 18. In other words, the bottom faces 20 are configured to be in contact with the ground, represented by a ground plane GP shown in FIGS. 4 and 7, as the article of footwear 10 is worn on the foot of a human. As indicated in FIGS. 4 and 7, not all of the bottom faces 20 are likely to be in contact with the ground at once, and different portions of the bottom faces 20 will be in contact with the ground as the wearer's foot moves relative to the ground.

For purposes of reference, the outsole 14 has a heel region 26, a midfoot region 27, and a forefoot region 28. The midfoot region 27 is between the heel region 26 and the forefoot region 28. For purposes of discussion, the heel region 26, the midfoot region 27, and the forefoot region 28 are defined as the rearmost third, the middle third, and the foremost third of the outsole 14. The heel region 26 generally includes portions of the outsole 14 corresponding with rear portions of a human foot including the calcaneus bone and of a size corresponding with the outsole 14 and article of footwear 10. Forefoot region 28 generally includes portions of the outsole 14 corresponding with the toes and the joints connecting the metatarsals with the phalanges of the human foot of the size corresponding with the outsole 14 and article of footwear 10. Midfoot region 27 generally includes portions of the outsole 14 corresponding with an arch area of the human foot of the size corresponding with the outsole 14 and article of footwear 10.

As used herein, a lateral side of a component for an article of footwear, such as a lateral side 22 of the outsole 14, is a side that corresponds with the side of the foot of the wearer of the article of footwear 10 that is generally further from the other foot of the wearer (i.e., the side closer to the fifth toe of the wearer). The fifth toe is commonly referred to as the little toe. A medial side of a component for an article of footwear, such as a medial side 24 of the outsole 14, is the side that corresponds with an inside area of the foot of the wearer and is generally closer to the other foot of the wearer (i.e., the side closer to the hallux of the foot of the wearer). The hallux is commonly referred to as the big toe. The lateral side 22 and the medial side 24 both extend around the periphery of the outsole 14 from the foremost extent 42 to the rearmost extent 44.

In the embodiment of FIG. 1, the tread elements 18 extend nonlinearly from the lateral side 22 to the medial side 24. As used herein, extending "nonlinearly", in a "nonlinear manner", or having a "nonlinear configuration", as used with respect to a tread element 18 means that the tread element 18 bends or winds lengthwise between the lateral side 22 and the medial side 24. When used with respect to a tread element 18, lengthwise means the expanse of the tread element 18 from the lateral side 22 to the medial side 24. A tread element 18 can extend nonlinearly by having a variety of connected linear segments or connected curved segments between the lateral side 22 and the medial side 24. In other embodiments, only some of the tread elements 18 extend nonlinearly from the lateral side 22 to the medial side 24. In still other embodiments, the tread elements 18 extend linearly from the lateral side 22 to the medial side 24. In all of these possible embodiments, at least some of the tread elements 18 have bottom faces that vary in width between the front face and the rear face in correspondence with a predetermined wear pattern.

In the embodiment of FIG. 1, each of the tread elements 18 has alternating first segments 30 and second segments 32. The first segments 30 extend from the lateral side 22 to the medial side 24 generally in a first direction that is at least partially toward the forefoot region 28 of the outsole 14, and the second segments 32 extend from the lateral side 22 to the medial side 24 generally in a second direction that is at least partially toward the heel region 26. First and second segments 30, 32 of one of the tread elements 18 are labeled in FIG. 1 to illustrate this arrangement. With this arrangement, each of the tread elements 18 extends in a generally zig-zag manner between the lateral side 22 and the medial side 24. The article of footwear 10 with the tread elements 18 arranged in this manner has what is referred to by those skilled in the art as a herringbone tread pattern. Optionally, one or more logos or other aesthetic or functional shapes may be molded with or attached to the bottom side 41 of the outsole 14 or elsewhere on the outsole, interrupting some of the tread elements 18, in which case those interrupted tread elements will not extend continuously from the lateral side 22 to the medial side 24.

Figure 2:
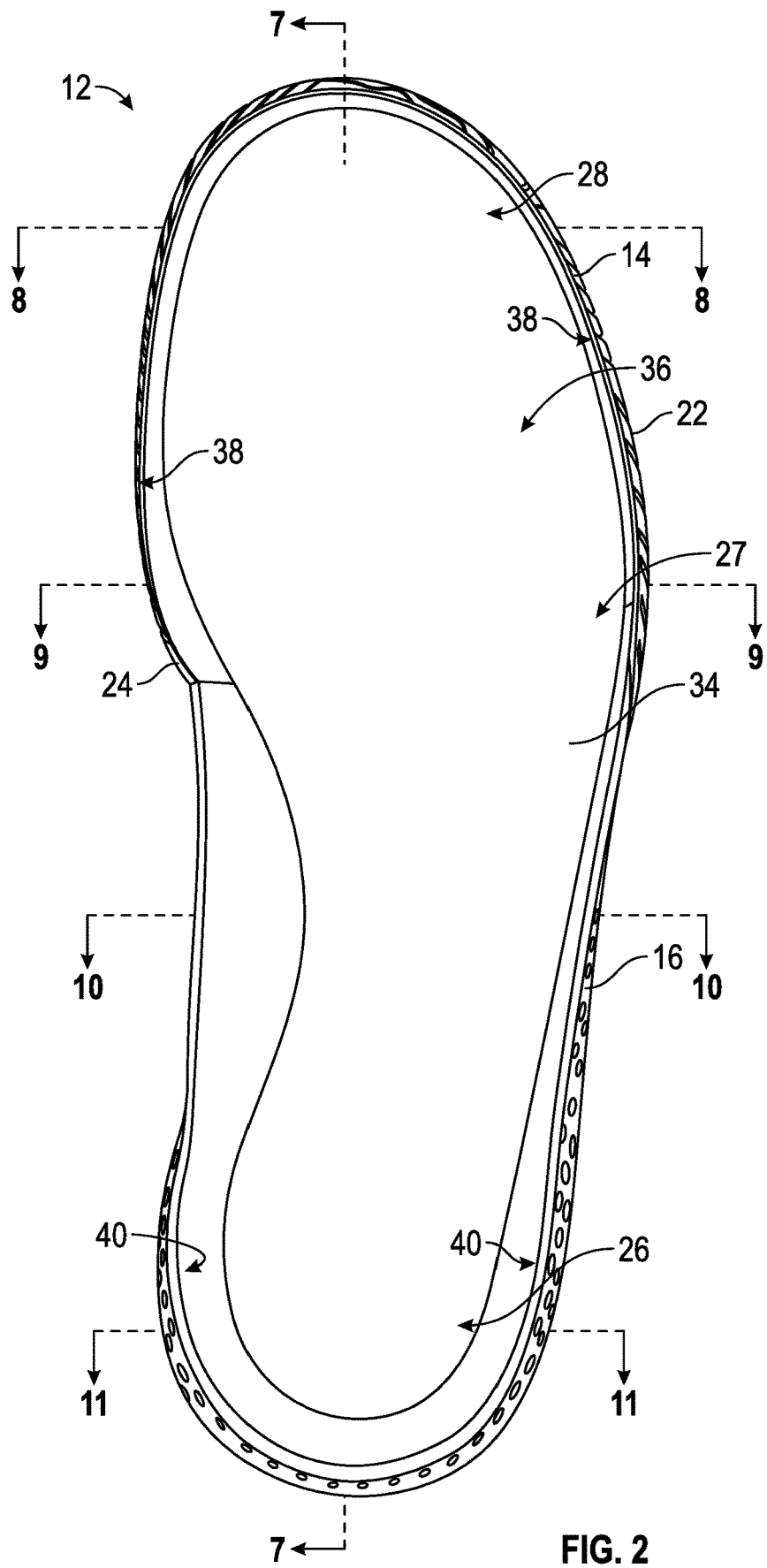
FIG. 2 is a schematic illustration in plan view showing the sole structure of FIG. 1.

In FIG. 2, the outsole 14 is visible near the forefoot region 28 and only the first midsole component 16 is visible in the heel region 26. The first midsole component 16 extends only over the heel region 26 and most or all of the midfoot region 27. The sole structure 12 also includes a cushioning insert component 34 that overlays the outsole 14 and the first midsole component 16 and extends over the heel region 26, the midfoot region 27 and the forefoot region 28. The outsole 14 may be a thermoplastic rubber or other suitably durable material. The material for the outsole 14 may be selected to provide a desirable combination of durability and flexibility. The midsole component 16 may be a material that combines a desired level of resiliency and support, such as an ethylene vinyl acetate (EVA) foam. The insert component 34 may also be a cushioning foam component, such as a lighter weight and less rigid foam than the midsole component 16.

The outsole 14 and midsole component 16 can be secured to one another by thermoforming during a molding process, by thermoplastic layers that melt to bond the components, by adhesives, or by any other suitable manner. A footwear upper (not shown) is secured in any suitable manner to the sole structure 12. More specifically, the footwear upper is secured to an inner peripheral surface 38 of the outsole 14 near the forefoot region 28, and to an inner peripheral surface 40 of the insert component 34 in the heel region 26. The insert component 34 can be secured to the midsole component 16 and the outsole 14 and has a foot-receiving surface 36. In some embodiments, the footwear upper can also be secured to the insert component 34.

Figure 3:
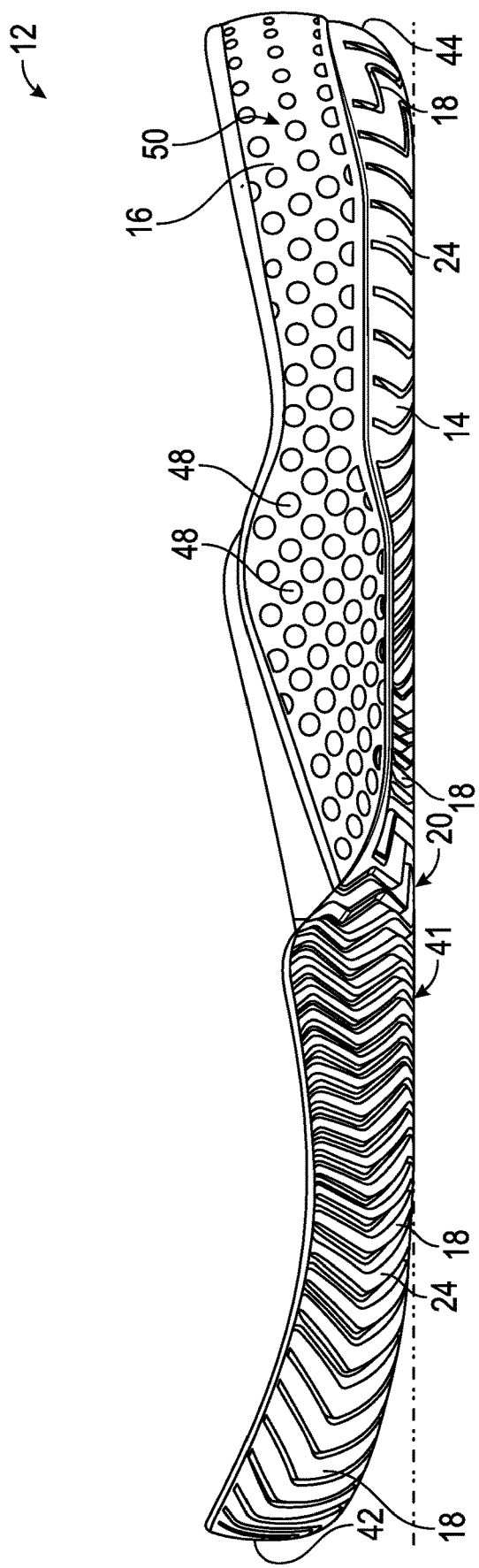
FIG. 3 is a schematic illustration in side view showing a medial side of the sole structure of FIGS. 1 and 2.
Figure 5:
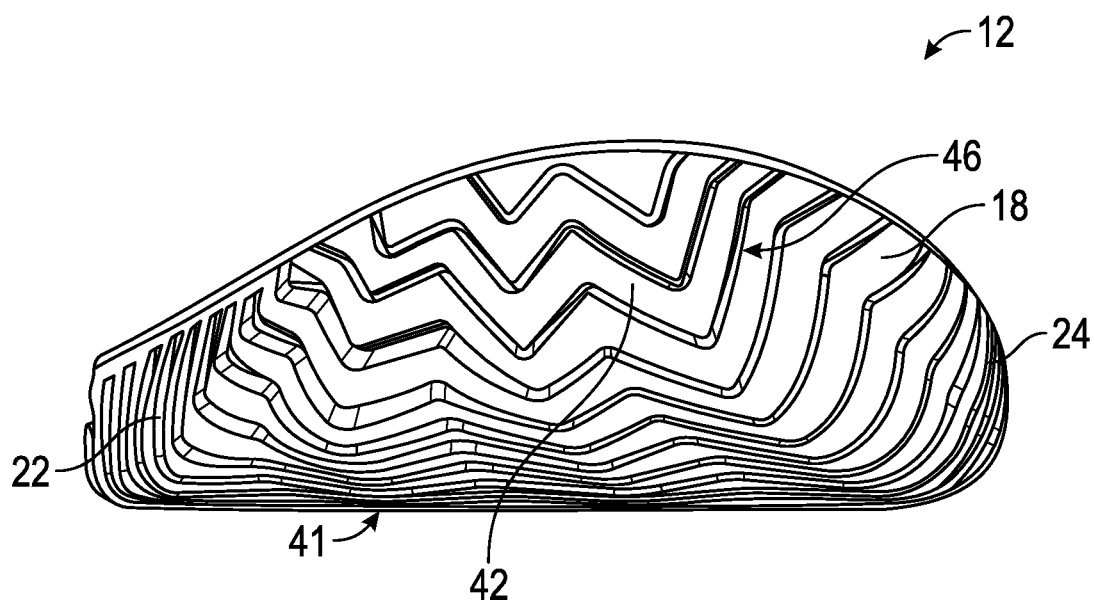
FIG. 5 is a schematic illustration in front view of the sole structure of FIGS. 1 and 2.
Figure 6:
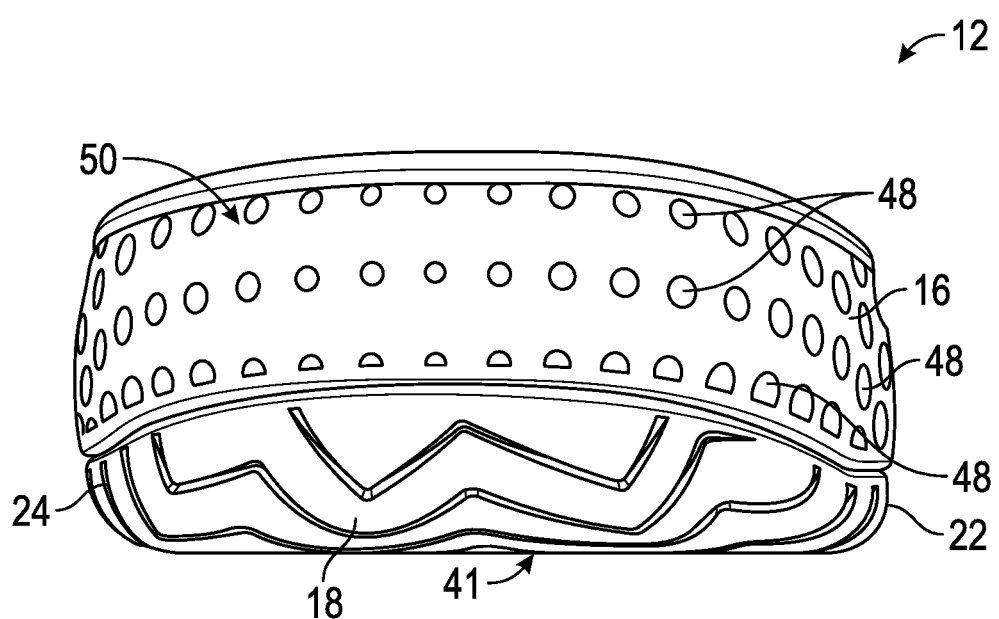
FIG. 6 is a schematic illustration in rear view of the sole structure of FIGS. 1 and 2.

FIG. 3 illustrates that the tread elements 18 extend from the bottom side 41 of the outsole 14 around to the medial side 24 of the outsole 14 and along the entire length of the outsole 14 from the foremost extent 42 to the rear most extent 44. FIG. 4 illustrates that the tread elements 18 extend from the bottom side 41 around to the lateral side 22 of the outsole 14 and along the entire length of the outsole 14 from the foremost extent 42 to the rear most extent 44. In other embodiments, the tread elements 18 may extend along some of the length between the foremost extent 42 and the rearmost extent 44. FIG. 5 illustrates that the tread elements 18 extend from the bottom side 41 around to a toe area surface 46 at the foremost extent 42 of the outsole 14. In each of the views, only some of the tread elements 18 are indicated with a reference number for clarity. FIGS. 3, 4, and 6 show a pattern of dimples 48 on an outer surface 50 of the first midsole component 16. The dimples 48 may provide flexibility and reduce weight, and may be for aesthetic purposes. The first midsole component 16 may instead have other surface patterns for functionality, aesthetics, or both. FIGS. 8-11 show cross-sections through the sole structure 12 that cut through multiple ones of the nonlinear tread elements 18.

FIGS. 1, 7, and 14-19 show that each of the tread elements 18 has a front face 52, a rear face 54, and the bottom face 20 that connects the front face 52 and the rear face 54. The front face 52, rear face 54, and bottom face 20 of each tread element 18 extend continuously between the lateral side 22 and the medial side 24 as is apparent in FIG. 1. The front face 52 of each tread element 18 is on the generally forward-facing side of the tread element 18, which is the side closer to the forward-most extent 42. The rear face 54 of each tread element 18 is on the generally rearward-facing side of the tread element 18, which is the side closer to the rearward-most extent 44. As is apparent in FIG. 1, the front face 52 and the rear face 54 of each tread element 18 vary in orientation according to the nonlinear shape of the tread element 18. Respective nonlinear grooves 58 are defined in the outsole 14 between adjacent ones of the tread elements 18. The outsole 14 can be configured so that a distance D between segments of at least some consecutive ones of the grooves 58 remains substantially constant from the lateral side 22 to the medial side 24, as indicated in FIG. 1. For other ones of the grooves 58, this distance can vary.

It should be appreciated that although the tread elements 18 are integrally formed with the body 17 of the outsole 14 in the embodiment shown so that the outsole 14 is a unitary, one-piece component, the tread elements 18 could instead be separately formed and applied to and secured to the body 17 in other embodiments.

At least some of the tread elements have a bottom face 20 with a width between the front face 52 and the rear face 54 that varies between the lateral side 22 and the medial side 24 in correspondence with a predetermined wear pattern 19 of the article of footwear 10. In the embodiment shown, each tread element 18 has a respective bottom face 20 that has different widths W1, W2, W3, W4, W5, or W6 in different portions of the tread element 18 corresponding with a predetermined wear pattern 19 expected of the outsole 14. The front face 52 and rear face 54 of each tread element 18 varies in angle A1, A2, A3, A4, A5, or A6 with respect to the body 17 of the outsole 14 as necessary to maintain a generally planar outer surface along any given segment 30, 32 while extending between the body 17 and the bottom face 20 with changing width W1-W6.

Figure 12:
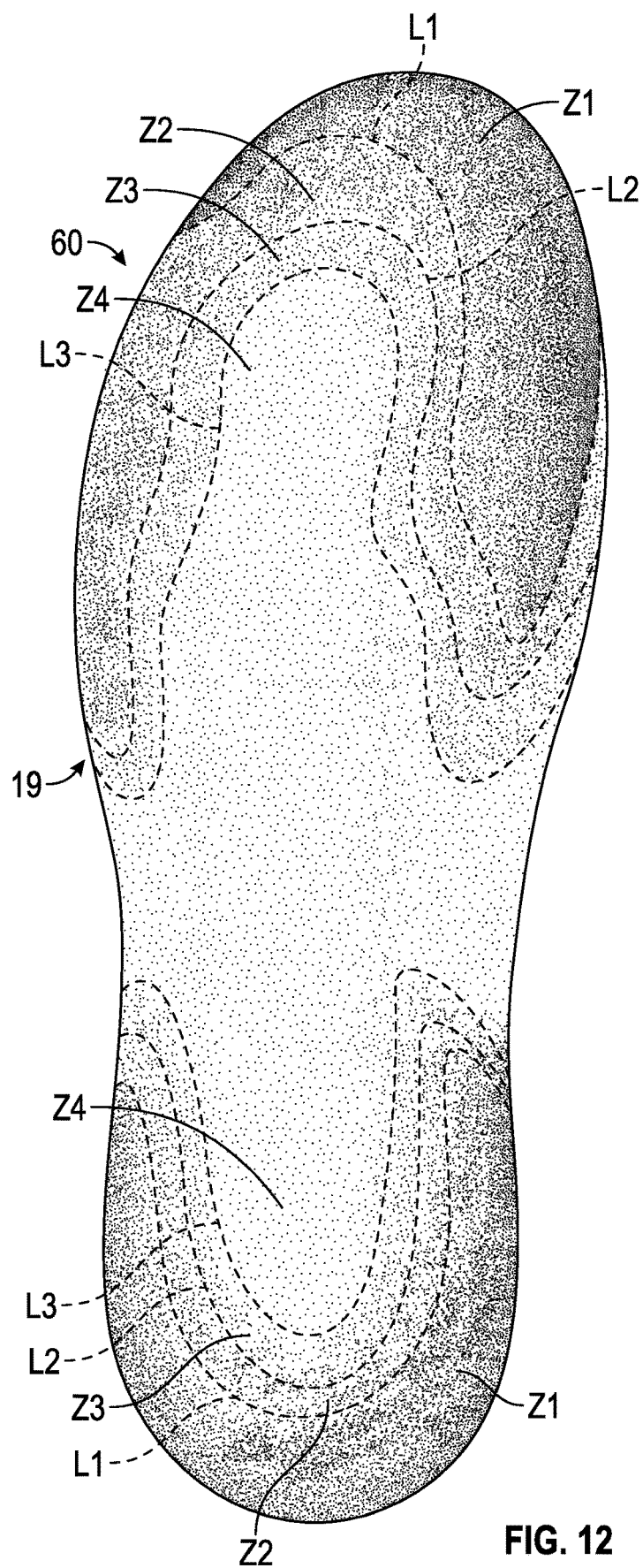
FIG. 12 is a schematic illustration of a durability map for an article of footwear showing a wear pattern with different relative wear regions.

FIG. 12 is a durability map 60 showing a wear pattern 19. The wear pattern 19 is the shape and location of numerous wear zones Z1, Z2, Z3, and Z4, also referred to as wear regions or pressure zones, as each is associated with a different range of wear at different locations of the outsole tested. As used herein, "wear" is a reduction in thickness in the outsole 14 and, potentially, reduction in thickness of the midsole 16 if wear extends to the midsole 16. The wear pattern 19 is based on wear testing of an outsole while worn on a human foot. Alternatively, wear testing could be carried with the outsole supported on a mechanical form such as a shoe last. For example, the wear pattern can be developed based on outsole thickness measurements taken at various locations of the outsole over a test period during which the outsole is subjected to a specific physical activity. For example, the article of footwear 10 may be used for tennis, in which case the wear pattern is based on measurements taken after different periods of tennis play. The durability map 60 can be developed using an outsole having any of many different tread patterns, such as a traditional herringbone tread pattern with tread elements of a constant cross-sectional width from lateral side to medial side. An outsole 14 with tread elements 18 corresponding to the wear pattern 19 and configured as described may have improved durability in comparison to an outsole with a traditional herringbone pattern with tread elements of a constant width.

In FIG. 12, the magnitude of the average wear in each wear zone Z1, Z2, Z3, and Z4 is indicated by the density of shading. Accordingly, wear zones Z1 cover the areas that experienced wear in a first, highest range of wear. Wear zones Z2 cover areas that experienced wear in a second range of wear lower than the first range of wear. Wear zones Z3 cover areas that experienced wear in a third range of wear lower than the second range of wear. Wear zones Z4 cover areas that experienced wear in a fourth range of wear lower than the third range of wear. Thus, portions of the outsole within wear zone Z1 have a greater wear characteristic than portions of the outsole within wear zone Z4, where the wear characteristic is the average wear experienced in the wear zone.

Figure 13:
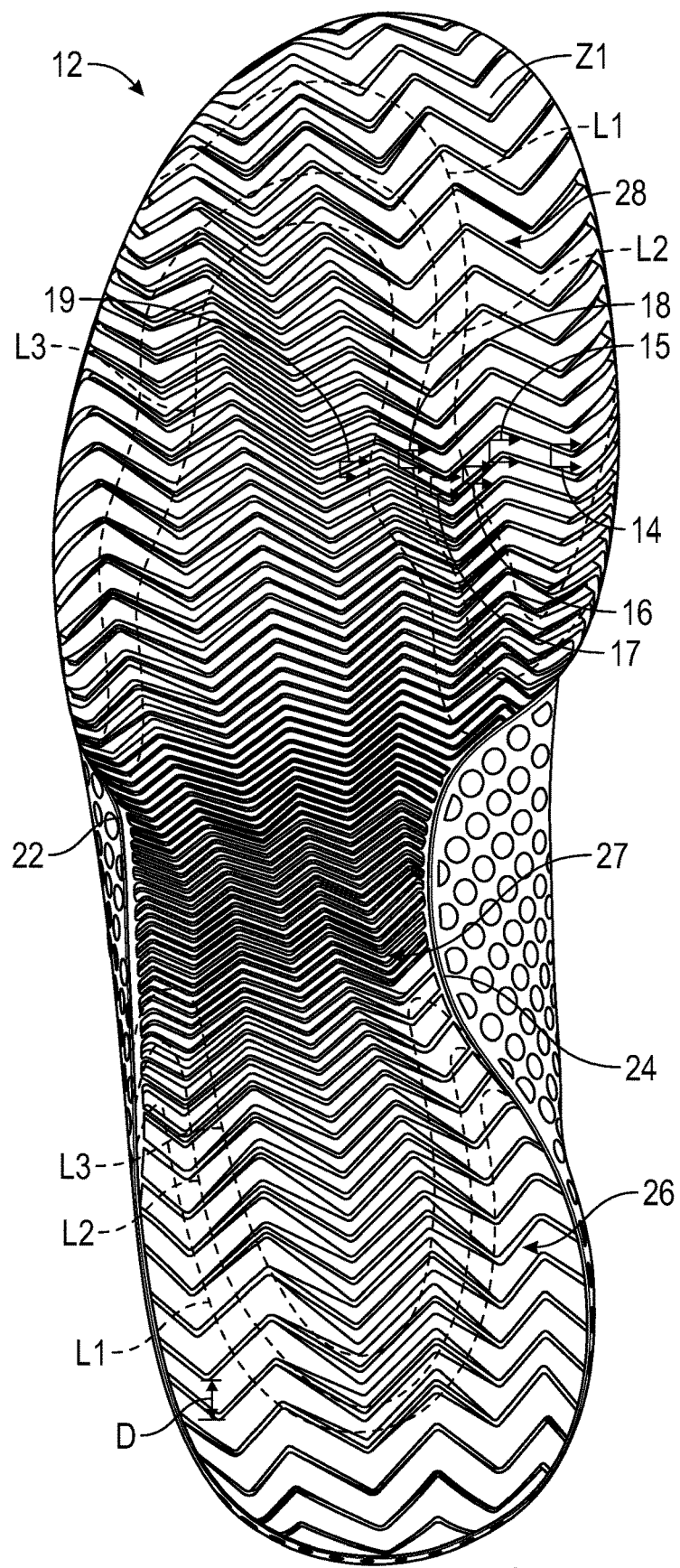
FIG. 13 is a schematic illustration in bottom view of the sole structure of FIGS. 1 and 2 showing portions of bottom faces of tread elements of the outsole with widths corresponding with the wear regions of the wear map of FIG. 12.

FIGS. 13-19 indicate that the bottom faces 20 of the tread elements 18 of the outsole 14 are designed to vary in width between front and rear faces 52, 54 from the lateral side 22 to the medial side 24 according to the variation in wear zones Z1-Z4 in the corresponding wear map 60 for the corresponding portion of the outsole 14. That is, different ones of the tread elements 18 have different portions in which the bottom face 20 has any one of different widths W1, W2, W3, W4, W5, W6, resulting in different cross-sectional profiles of the tread element 18. In the embodiment shown, not all of the tread elements 18 have portions with all of the different widths W1-W6. That is, some of the tread elements 18 are of a uniform width W6 from the lateral side 22 to the medial side 24, such as those in the arch area at the midfoot region 27 of the outsole 14. By contrast, some of the tread elements 18 in the heel region 26 and in the forefoot region 28 have different portions that correspond with each of the zones Z1, Z2, Z3, Z4, and so have each of the different widths W1-W6 in progressing between the lateral side 22 and the medial side 24. In other embodiments, tread elements 18 designed to reflect different wear patterns may have differently mapped wear zones, may have fewer or more wear zones, and may therefore have tread elements with portions having bottom faces with fewer or more widths. In FIGS. 12 and 13, phantom line L1 generally indicates the boundary or transition between wear zone Z1 and wear zone Z2, phantom line L2 generally indicates the boundary or transition between wear zone Z2 and wear zone Z3, and phantom line L3 generally indicates the boundary or transition between wear zone Z3 and wear zone Z4.

Figure 14:
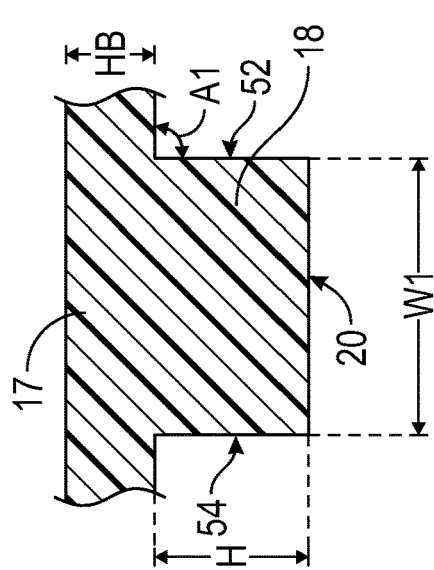
FIG. 14 is a schematic illustration in fragmentary cross-sectional view of a tread element taken at lines 14-14 in FIG. 13.

FIG. 14 shows a cross-section of a portion of a tread element 18 in the forefoot region 28 of the outsole 14. The portion of the tread element 18 corresponds with wear zone Z1. The bottom face 20 of the portion shown in FIG. 14 has a width W1. The front face 52 and rear face 54 extend perpendicularly from the body 17, at an angle A1 of 90 degrees. The tread element 18 extends downward from the body 17 so that it has a height H. In other words, the tread element 18 elevates the body 17 by a distance H from the ground plane GP of FIG. 7 when the outsole 14 is placed facing downward, with the bottom surface 20 in contact with the ground plane GP.

Figure 15:
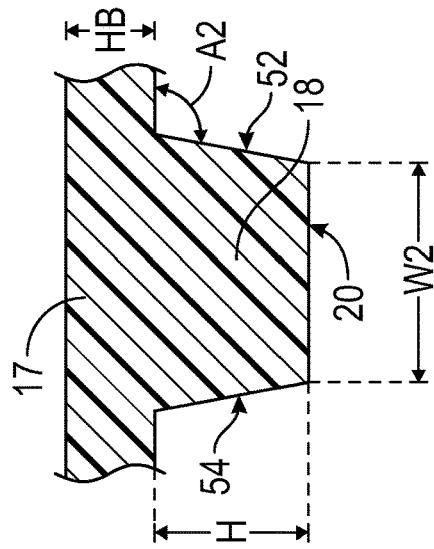
FIG. 15 is a schematic illustration in fragmentary cross-sectional view of a tread element taken at lines 15-15 in FIG. 13.

FIG. 15 shows a cross-section of a portion of the same tread element 18 of FIG. 14. The portion of the tread element 18 shown in FIG. 15 corresponds with a transition between wear zones Z1 and Z2. The bottom face 20 of the portion shown in FIG. 15 has a width W2 less than width W1. The front face 52 and rear face 54 extend from the body 17 at an angle A2 greater than 90 degrees. The tread element 18 extends downward from the body 17 so that it has the same height H as in FIG. 14.

Figure 16:
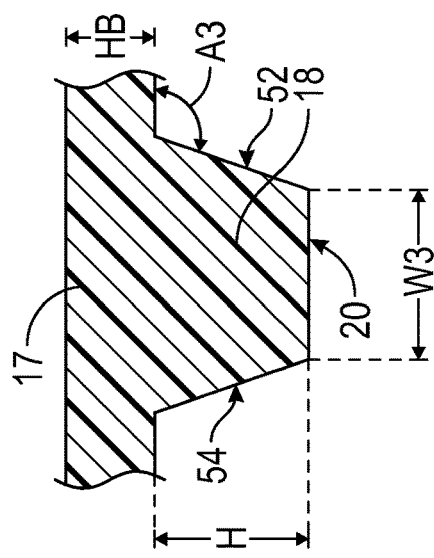
FIG. 16 is a schematic illustration in fragmentary cross-sectional view of a tread element taken at lines 16-16 in FIG. 13.

FIG. 16 shows a cross-section of a portion of the same tread element 18 of FIGS. 14 and 15. The portion of the tread element 18 shown in FIG. 16 corresponds with wear zone Z2. The bottom face 20 of the portion shown in FIG. 16 has a width W3 less than width W2. The front face 52 and rear face 54 extend from the body 17 at an angle A3 greater than angle A2. The tread element 18 extends downward from the body 17 so that it has the same height H as in FIG. 14.

Figure 17:
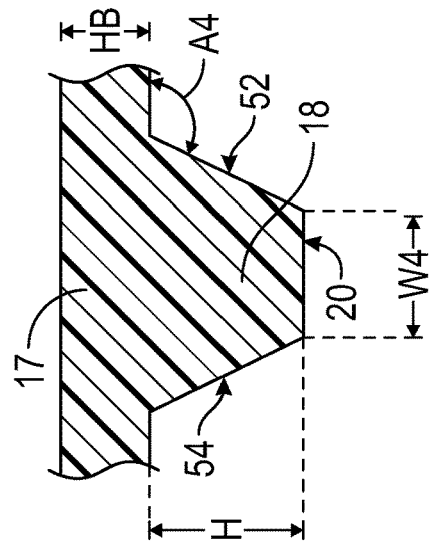
FIG. 17 is a schematic illustration in fragmentary cross-sectional view of a tread element taken at lines 17-17 in FIG. 13.

FIG. 17 shows a cross-section of a portion of the same tread element 18 of FIGS. 14-16. The portion of the tread element 18 shown in FIG. 17 corresponds with a transition between zones Z2 and Z3. The bottom face 20 of the portion shown in FIG. 17 has a width W4 less than width W3. The front face 52 and rear face 54 extend from the body 17, at an angle A4 greater than angle A3. The tread element 18 extends downward from the body 17 so that it has the same height H as in FIG. 14.

Figure 18:
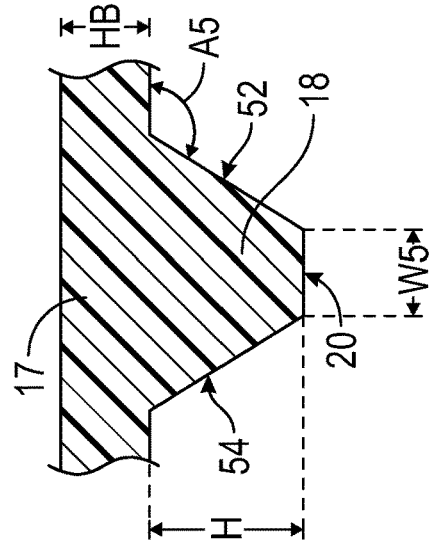
FIG. 18 is a schematic illustration in fragmentary cross-sectional view of a tread element taken at lines 18-18 in FIG. 13.

FIG. 18 shows a cross-section of a portion of the same tread element 18 of FIGS. 14-17. The portion of the tread element 18 shown in FIG. 18 corresponds with wear zone Z3. The bottom face 20 of the portion shown in FIG. 18 has a width W5 less than width W4. The front face 52 and rear face 54 extend from the body 17, at an angle A5 greater than angle A4. The tread element 18 extends downward from the body 17 so that it has the same height H as in FIG. 14.

Figure 19:
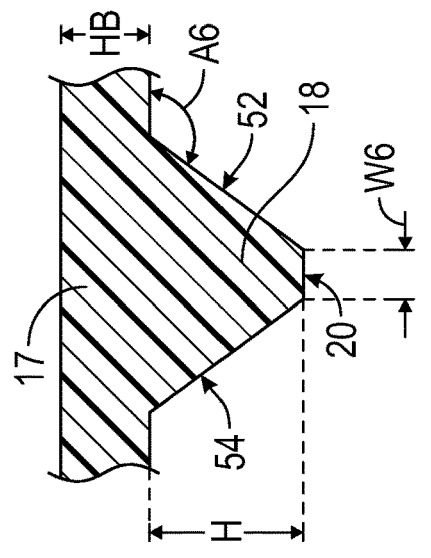
FIG. 19 is a schematic illustration in fragmentary cross-sectional view of a tread element taken at lines 19-19 in FIG. 13.

FIG. 19 shows a cross-section of a portion of the same tread element 18 of FIGS. 14-18. The portion of the tread element 18 shown in FIG. 19 corresponds with wear zone Z4. The bottom face 20 of the portion shown in FIG. 19 has a width W6 less than width W5. The front face 52 and rear face 54 extend from the body 17, at an angle A6 greater than angle A5. The portion of the tread element 18 shown in FIG. 19 can be referred to herein as a first portion in a first wear region (i.e., wear zone Z4), and the portion of the tread element 18 shown in FIG. 14 can be referred to as a second portion in a second wear region (i.e., wear zone Z1), and has a higher wear characteristic (i.e., amount of wear) than wear zone Z4. The tread element 18 extends downward from the body 17 so that it has the same height H as in FIG. 14.

The angles A1-A6 and the corners at transitions between the body 17 and the faces 54, 56 or between the faces 54, 56 and the bottom face 20 can be chamfered or rounded for ease in release from within mold cavities if the tread elements 18 are molded with the body 17.

FIGS. 14-18 thus illustrate that in areas of relatively low wear, such as areas corresponding with the wear zone Z4, the tread elements 18 can have a first portion with a generally trapezoidal cross-sectional profile, with the front and rear faces 52, 54 tapering toward one another to a peak at the very narrow bottom face 20 serving as the ground contact surface. The tread element 18 has a cross-sectional profile of an inverted trapezoid in wear zone Z4. In areas of relatively high wear such as areas corresponding with wear zone Z1, the same tread element 18 can have another portion, such as shown in FIG. 14, referred to herein as a second portion, in which the front and rear faces 52, 54 are generally parallel with one another and the tread element 18 has a generally rectangular cross-sectional profile, so that a width W1 of the bottom face 20 is greater at the second portion than at the first portion.

As indicated in FIGS. 14-19, the tread element 18 can be configured to have a substantially identical height H that is unvarying in different portions in different wear zones and, at least in some tread elements, from the medial side 22 to the lateral side 24. In some embodiments, the height H need not be unvarying for every tread element 18. Because the second portion of the tread element 18 in the relatively high wear zone Z1 has the same height H but a wider bottom surface 20 as the first portion in the relatively lower wear zone Z4, the second portion of the tread element 18 has a greater cross-sectional area, and thus more material to resist wear and abrasion where most needed, as indicated by the wear pattern 19. More peaked areas of the tread elements 18, such as the first portion of the tread element of FIG. 19, may exhibit greater grip and traction than less peaked areas. By providing both types of cross-sectional profiles, as well as a variety of additional cross-sectional profiles shown in FIGS. 15-18 greater durability can be achieved while still providing a desirable amount of grip and traction. Additionally, the height HB of the body 17 above the tread element 18 is substantially unvarying in different portions of the tread element 18 located in different wear zones Z1-Z4. As used herein, the height of the tread elements 18, the height HB of the body 17, or the height of the entire outsole 14 is "substantially unvarying" or "substantially identical" if variation in the height remains within the manufacturing tolerances for the outsole 14. By way of non-limiting example, the manufacturing tolerance for the height of the tread elements 18, the height HB of the body 17, or the height of the entire outsole 14 may be ±5 percent of a specified height dimension.

Referring again to FIGS. 12 and 13, the wear pattern 19 includes a relatively high wear region of wear zone Z1 at the medial side 24 of the forefoot region 28 and a relatively lower wear region of wear zone Z2 adjacent the high wear region of wear zone Z1. The respective widths of the bottom faces 20 of the tread elements 18 in the forefoot region 28 are wider in the generally high wear region of zone Z1 than in the relatively low wear region of zone Z2. The widths are even less in even lower wear regions of zone Z3 and zone Z4.

The wear pattern 19 also includes a generally U-shaped wear region corresponding with the heel region 26. For example, wear zone Z1 corresponding with the heel region 26 is generally U-shaped, as is wear zone Z2 and wear zone Z3. The respective widths of the bottom faces 20 are wider in the generally U-shaped wear regions of wear zones Z1, Z2, and Z3 in the heel region 28 than in a remainder of the heel region at zone Z4 surrounded by the U-shaped wear region.

Figure 20:
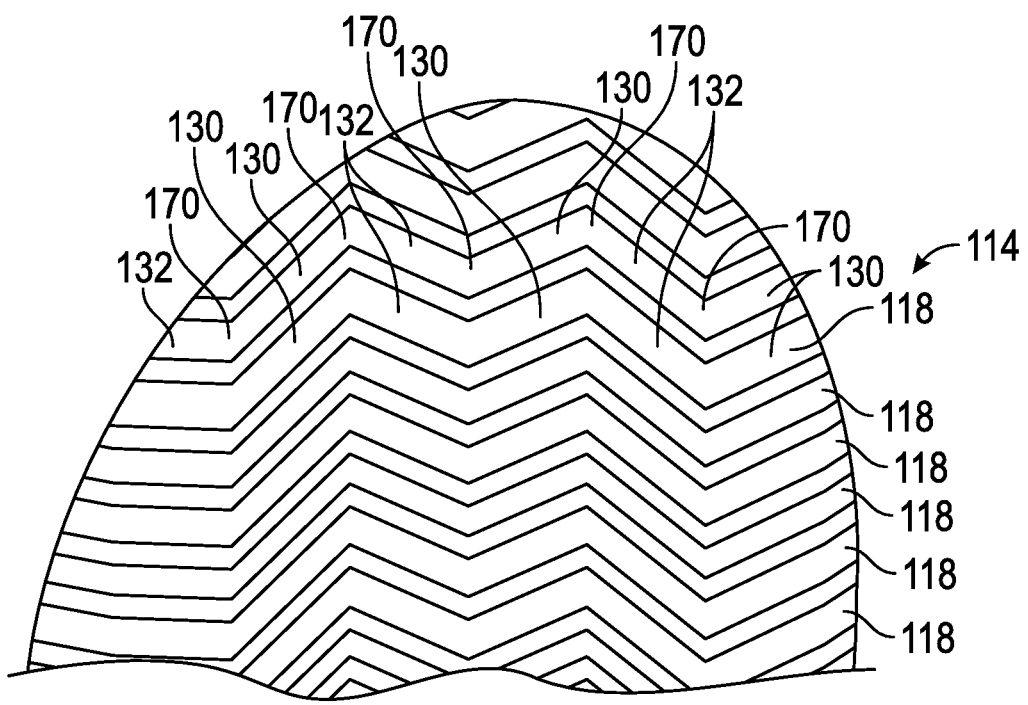
FIG. 20 is a schematic illustration in fragmentary bottom view of an alternative outsole in accordance with another aspect of the present teachings.

FIG. 20 shows an alternative embodiment of an outsole 114 for the article of footwear 10. The outsole 114 is alike in all aspects to outsole 14 with tread elements 118 alike in all aspects to tread elements 18 except that the herringbone pattern of tread elements 118 is slightly different. Transitions 170 between alternating segments 130, 132 of each tread element 118 align with corresponding transitions 170 of all other tread elements 118 in a linear manner rather than in the manner shown in FIG. 1 with respect to outsole 14 in which the transitions gradually shift laterally in progressing between the foremost extent 42 and the rear most extent 44.

Figure 21:
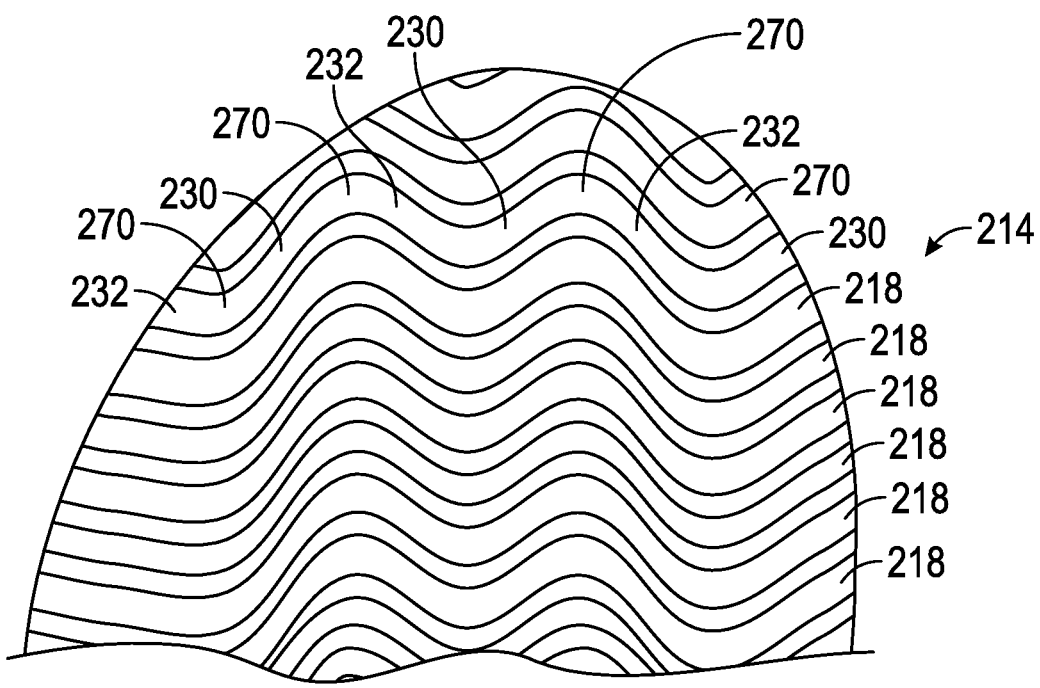
FIG. 21 is a schematic illustration in fragmentary bottom view of another alternative outsole in accordance with another aspect of the present teachings.

FIG. 21 is another embodiment of an outsole 214 for the article of footwear 10. The outsole 214 is alike in all aspects to outsole 14 except that transitions 270 between alternating segments 230, 232 of each tread element 218 are curved and less angular.

Figure 22:
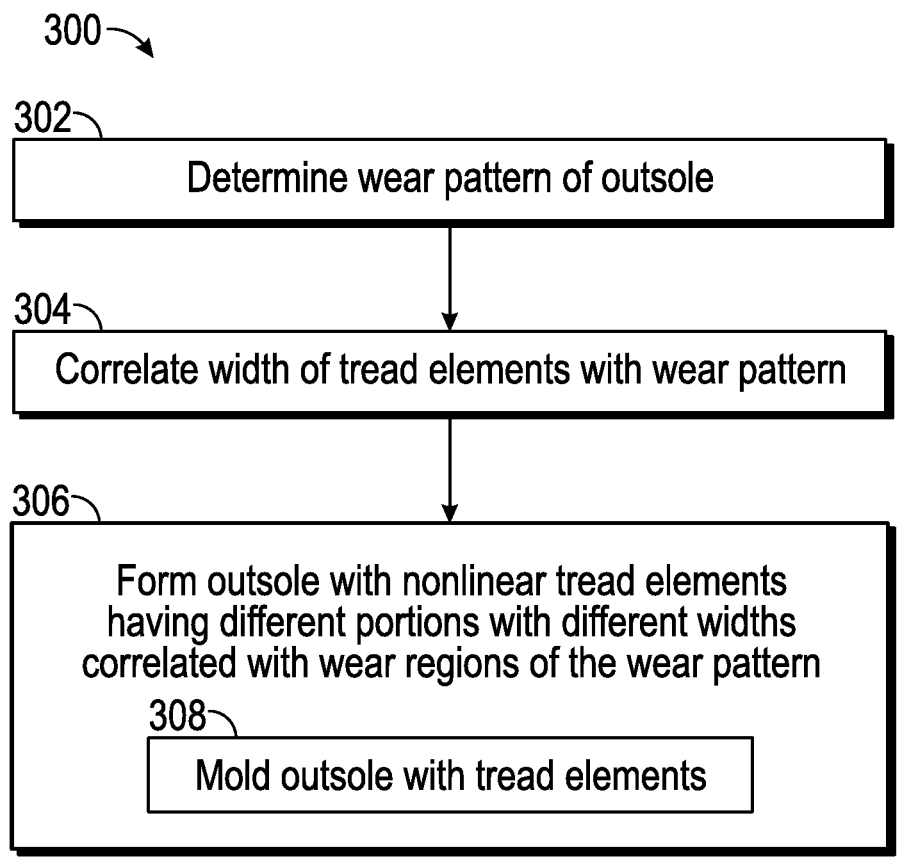
FIG. 22 is a flow diagram of a method of manufacturing the article of footwear with the outsole of any of FIGS. 1, 20, and 21.
Figure 23:
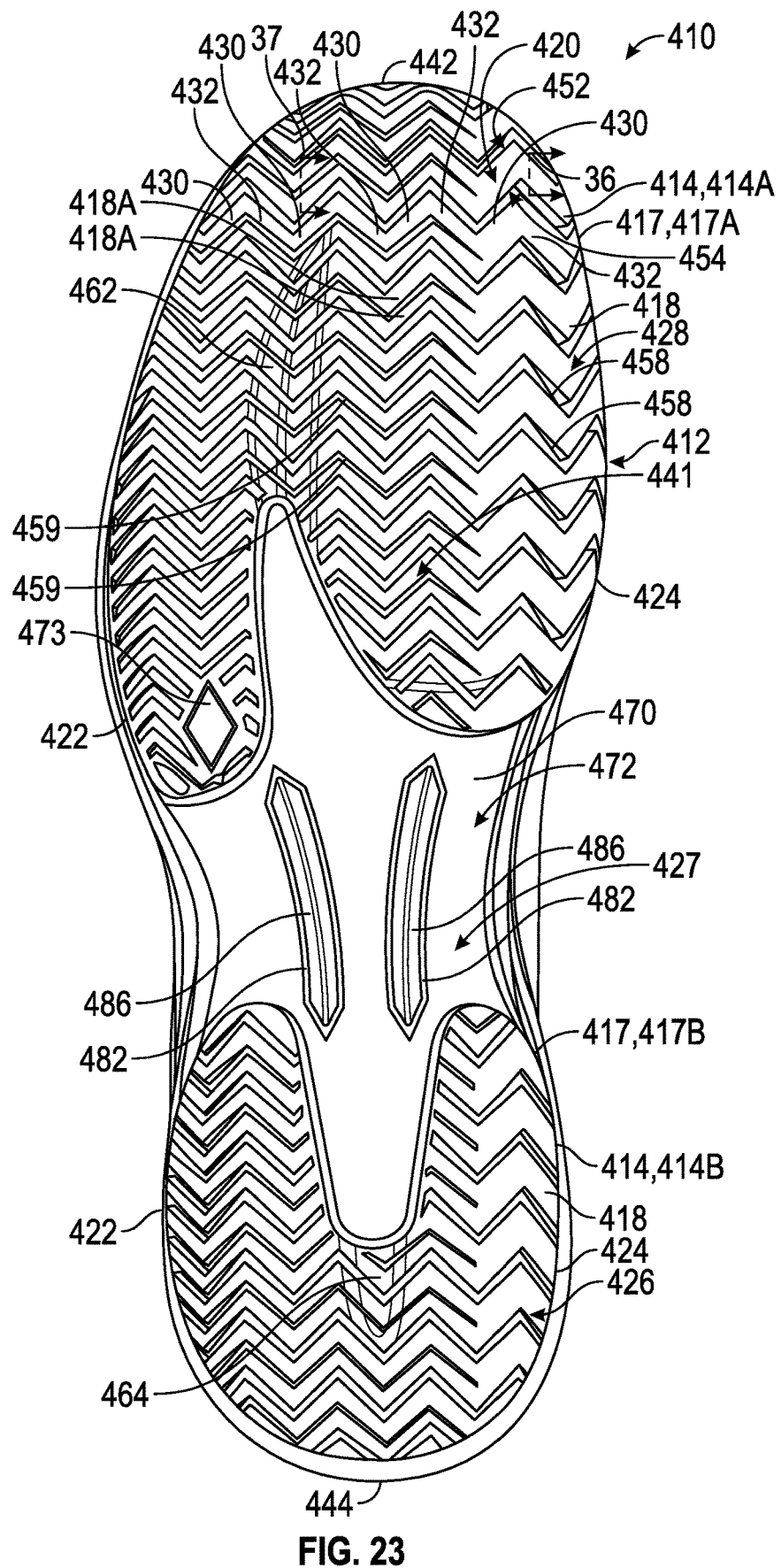
FIG. 23 is a schematic bottom view illustration of another embodiment of a sole structure for an article of footwear having another embodiment of an outsole.
Figure 24:
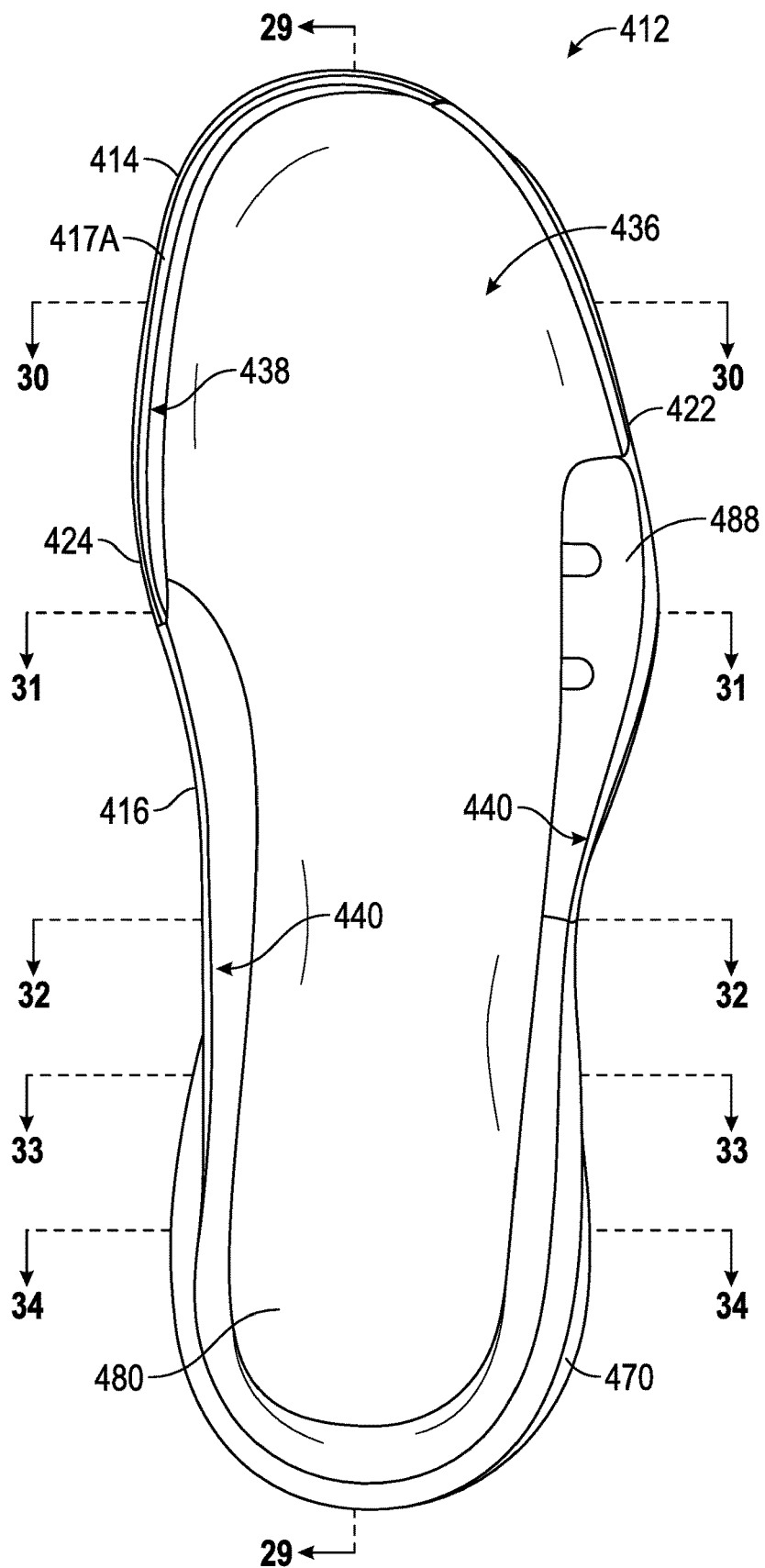
FIG. 24 is a schematic illustration in plan view showing the sole structure of FIG. 23.

FIG. 22 shows a method 300 of manufacturing an outsole for an article of footwear, such as any of the outsoles 14, 114, and 214, as well as outsole 414 of FIG. 23. The method 300 may include steps 302 and 304, determining a wear pattern 19 of an outsole in step 302 and then, in step 304, designing the outsole to be manufactured so that widths of different portions of tread elements 18, 118, or 218 at a ground contact surface of the outsole are correlated with the different wear regions of the wear pattern 19, as discussed with respect to FIGS. 12 and 13. For example, an outsole can be tested during use of a particular activity, and a wear pattern 60 or expected wear pattern can be determined in step 302 for the outsole manufactured according to the method 300.

In step 306, an outsole is then formed according to the widths determined in step 304. Steps 302 and 304 can be performed by the same entity performing step 306, or by a separate entity. If step 306 is performed by a separate entity than the entity performing steps 302 and 304, information regarding specific dimensions of the widths determined according to steps 302 and 304 can be provided to the entity carrying out step 306, such as in the form of design specifications or mold specifications if the outsole is to be molded with the tread elements.

Forming the outsole in step 306 is done so that tread elements such as tread elements 18, 118, or 218 extend from a lateral side to a medial side of the outsole, and so that portions of bottom faces 20 of the tread elements correlated with a relatively high wear region, such as wear zone Z1 of the wear pattern 19, are wider than portions of the bottom faces of the tread elements correlated with a relatively low wear region of the wear pattern 19, such as wear zone Z2, Z3, or Z4.

Forming the outsole in step 306 may include sub-step 308, molding the outsole so that the body 17 and the tread elements 18 are integrally molded as a unitary component, as in the embodiment of FIG. 1. A mold assembly with mold cavities configured to provide the shape of the tread elements 18 would be used in sub-step 308. Alternatively, the body 17 of the outsole 14 can be molded, and the tread elements 18 could be separately molded or otherwise formed. The tread elements 18 can then be attached to the body 17 by bonding, adhesives, or any other suitable manner.

Figure 25:
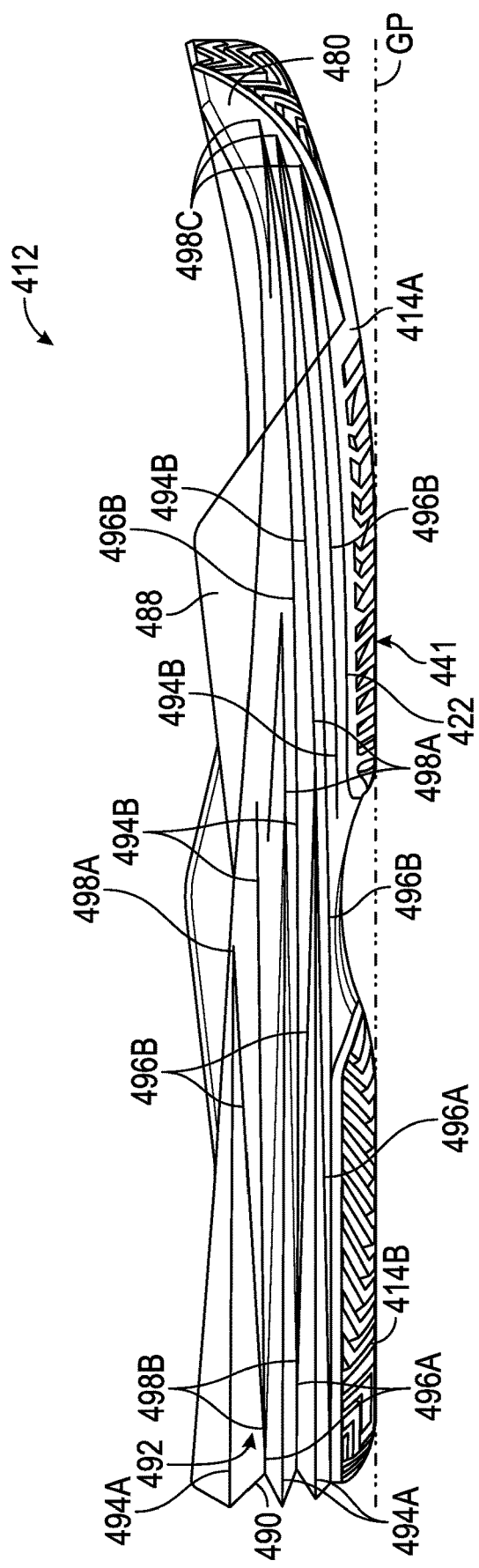
FIG. 25 is a schematic illustration in side view showing a lateral side of the sole structure of FIGS. 23 and 24.

FIG. 23 shows an article of footwear 410 that has an alternative sole structure 412 with an alternative outsole 414. The sole structure 412 also has a midsole assembly 416 secured to the outsole 414. As further discussed herein, the outsole 414 has a body 417 with tread elements 418 that extend from the body 417 to establish a ground contact surface generally corresponding with the predetermined wear pattern 19 shown in FIG. 12. Specifically, bottom faces 420 of each of the tread elements 418 have a respective width that varies between a lateral side 422 to a medial side 424 of the outsole 414 so that the width is greater in at least some relatively high wear areas than in at least some relatively low wear areas. The ground contact surface of the outsole 414 is the total surface of the bottom faces 420 of all of the tread elements 418. In other words, the bottom faces 420 are configured to be in contact with the ground, represented by a ground plane GP shown in FIG. 25, as the article of footwear 410 is worn on the foot of a human. As indicated in FIG. 25, not all of the bottom faces 420 are likely to be in contact with the ground at once, and different portions of the bottom faces 420 will be in contact with the ground as the wearer's foot moves relative to the ground.

The outsole 414 is divided into two discontinuous outsole portions 414A, 414B. The first outsole portion 414A is generally at a forefoot region 428 of the sole structure 412, and the second outsole portion 414B is generally at a heel region 426 of the sole structure 412. A midfoot region 427 of the sole structure 412 is not covered by the outsole 414. In FIG. 23, a first layer 470 of the sole structure 412, also referred to herein as a first foam layer or as a resilient component, is exposed between the first outsole portion 414A and the second outsole portion 414B. The outsole portions 414A, 414B are attached to a lower surface 472 of the first layer 470 so that a portion of the lower surface 472 is exposed between the outsole portions 414A, 414B.

For purposes of discussion, the heel region 426 generally includes portions of the sole structure 412 corresponding with rear portions of a human foot including the calcaneus bone and of a size corresponding with the sole structure 412 and article of footwear 410. Forefoot region 428 generally includes portions of the sole structure 412 corresponding with the toes and the joints connecting the metatarsals with the phalanges of the human foot of the size corresponding with the sole structure 412 and article of footwear 410. Midfoot region 427 generally includes portions of the sole structure 412 corresponding with an arch area of the human foot of the size corresponding with the outsole 414 and article of footwear 410.

The lateral side 422 of the outsole 414 and of the sole structure 412 is a side that corresponds with the side of the foot of the wearer of the article of footwear 410 that is generally further from the other foot of the wearer (i.e., the side closer to the fifth toe of the wearer). The medial side 424 of the outsole 414 and of the sole structure 412 is the side that corresponds with an inside area of the foot of the wearer and is generally closer to the other foot of the wearer (i.e., the side closer to the hallux of the foot of the wearer). The lateral side 422 and the medial side 424 both extend around the periphery of the outsole 414 from a foremost extent 442 to a rearmost extent 444.

In the embodiment of FIG. 23, at least some of the tread elements 418 extend nonlinearly from the lateral side 422 to the medial side 424. As used herein, extending "nonlinearly", in a "nonlinear manner", or having a "nonlinear configuration", as used with respect to a tread element 418 means that the tread element 418 bends or winds lengthwise between the lateral side 422 and the medial side 424. When used with respect to a tread element 418, lengthwise means the expanse of the tread element 418 from the lateral side 422 to the medial side 424. A tread element 418 can extend nonlinearly by having a variety of connected linear segments or connected curved segments between the lateral side 422 and the medial side 424. In still other embodiments, the tread elements 418 extend linearly from the lateral side 422 to the medial side 424. In all of these possible embodiments, at least some of the tread elements 418 have bottom faces 420 that vary in width between the front face and the rear face in at least partial correspondence with a predetermined wear pattern.

In the embodiment of FIG. 23, each of the tread elements 418 has alternating first segments 430 and second segments 432. The first segments 430 extend from the lateral side 422 to the medial side 424 generally in a first direction that is at least partially toward the forefoot region 428 of the outsole 414, and the second segments 432 extend from the lateral side 422 to the medial side 424 generally in a second direction that is at least partially toward the heel region 426. First and second segments 430, 432 of one of the tread elements 418 are labeled in FIG. 23 to illustrate this arrangement. With this arrangement, each of the tread elements 418 extends in a generally zig-zag manner between the lateral side 422 and the medial side 424. The article of footwear 410 with the tread elements 418 arranged in this manner has what is referred to by those skilled in the art as a herringbone tread pattern. Optionally, one or more logos or other aesthetic or functional shapes may be molded with or attached to the bottom side 441 of the outsole 414 or elsewhere on the outsole, interrupting some of the tread elements 418, so that the interrupted tread elements do not extend continuously from the lateral side 422 to the medial side 424. For example, a molded shape 473 for a logo is included on the first outsole portion 414A.

Figure 26:
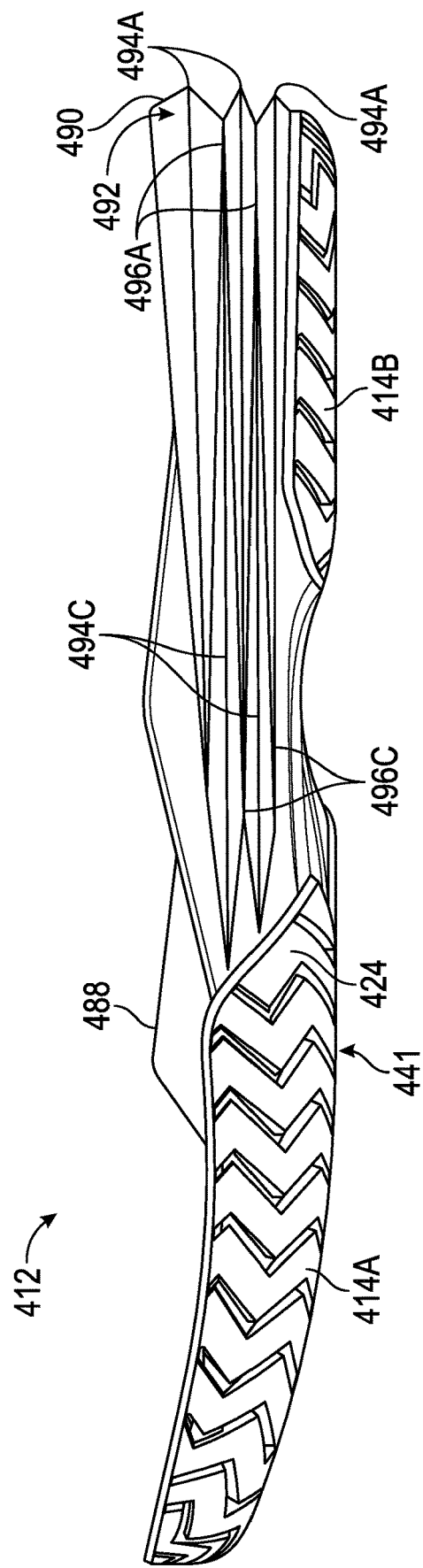
FIG. 26 is a schematic illustration in another side view showing a medial side of the sole structure of FIGS. 23 and 24.
Figure 27:
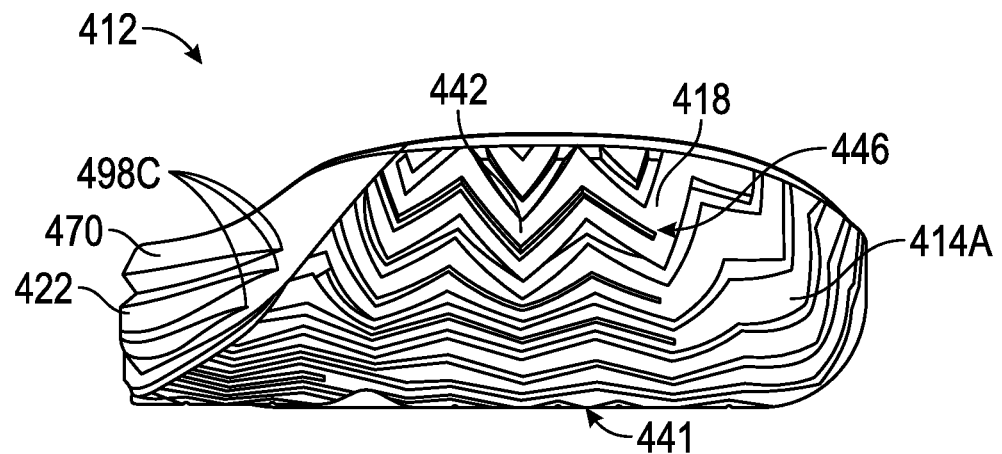
FIG. 27 is a schematic illustration in front view of the sole structure of FIGS. 23 and 24.
Figure 28:
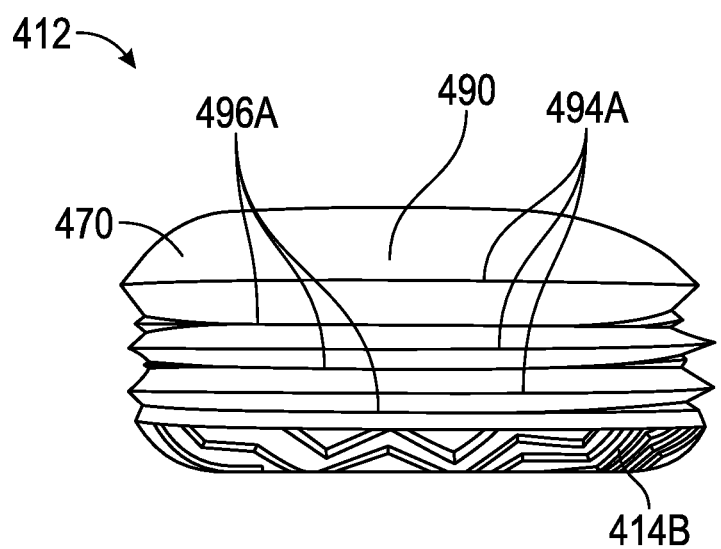
FIG. 28 is a schematic illustration in rear view of the sole structure of FIGS. 23 and 24.

FIGS. 23, 25, and 26 together illustrate that the tread elements 418 extend from the bottom side 441 of the outsole 414 around to the medial side 424 and the lateral side 422 of the outsole 414. FIG. 27 illustrates that the tread elements 418 extend from the bottom side 441 around to a toe area surface 446 at the foremost extent 442 of the outsole 414. In each of the views, only some of the tread elements 418 are indicated with a reference number for clarity.

FIGS. 29-34 show cross-sections through the sole structure 412 that cut through multiple ones of the nonlinear tread elements 418. It is apparent in FIGS. 29 and 30 that the body 417 of the outsole 414 has a first body portion 417A corresponding with the first outsole portion 414A, and a second body portion 417B corresponding with the second outsole portion 414B. The body 417 including body portions 417A, 417B is the part of the outsole 414 from which the tread elements 418 extend, and are positioned above the tread elements 418.

The outsole 414 is configured so that a height of the body 417 above the tread elements 418 is greater in a relatively high wear region than in a relatively low wear region. In other words, the body 417 has a height above at least some of the tread elements 418 that varies at least partially in correspondence with the predetermined wear pattern 19 of FIG. 12. The height of the tread elements 418 extending downward from the body 417 can be substantially unvarying from the lateral side 422 to the medial side 424 or, optionally, can vary. As used herein, the height of the tread elements 418, the height of the body 417, or the height of the entire outsole 414 is "substantially unvarying" or "substantially identical" if variation in the height remains within the manufacturing tolerances for the outsole 414. By way of non-limiting example, the manufacturing tolerance for the height of the tread elements 418, the height of the body 417, or the height of the entire outsole 414 may be ±5 percent of a specified height dimension.

Figure 30:
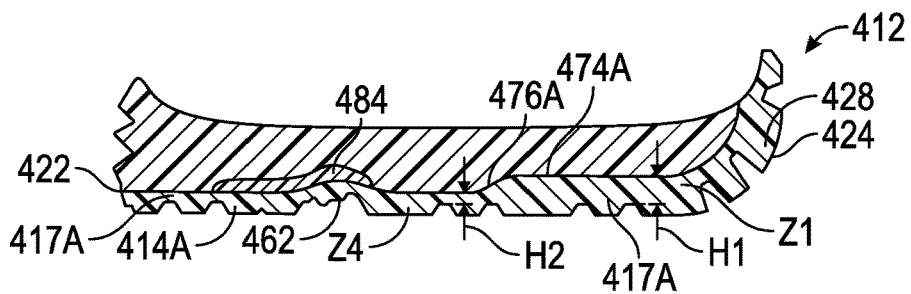
FIG. 30 is a schematic illustration in cross-sectional view of the sole structure of FIGS. 23 and 24 taken at lines 30-30 in FIG. 24.
Figure 31:
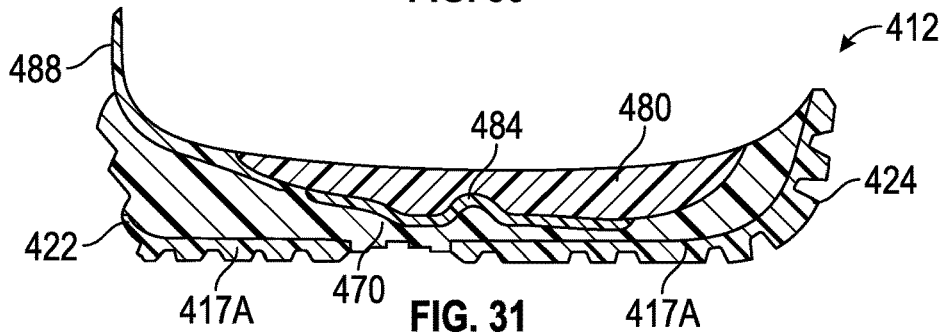
FIG. 31 is a schematic illustration in cross-sectional view of the sole structure of FIGS. 23 and 24 taken at lines 31-31 in FIG. 24.
Figure 36:
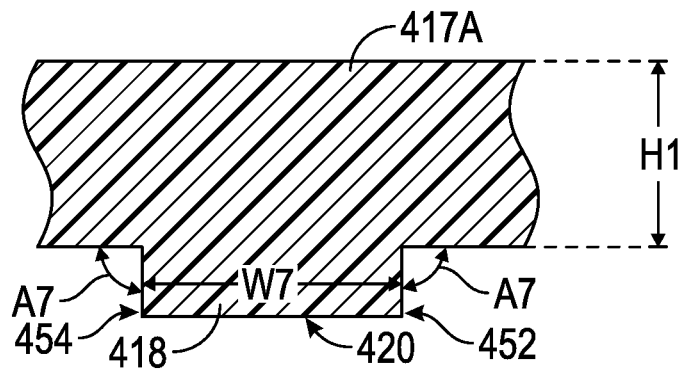
FIG. 36 is a schematic illustration in fragmentary cross-sectional view of a tread element taken at lines 36-36 in FIGS. 23 and 35.
Figure 37:
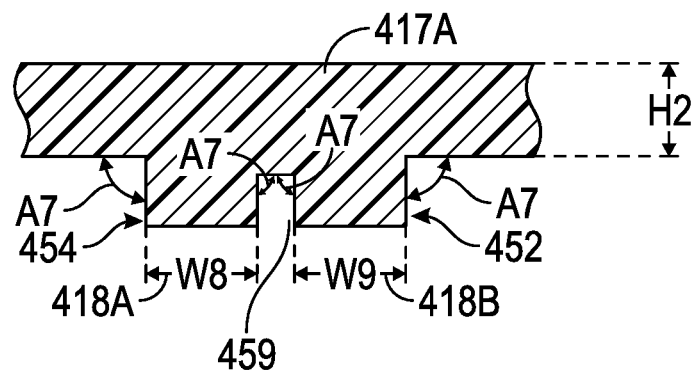
FIG. 37 is a schematic illustration in fragmentary cross-sectional view of a tread element taken at lines 37-37 in FIGS. 23 and 35.

Referring to FIGS. 30 and 36, the first body portion 417A has a height H1 near the medial side 424 of the forefoot region 428, which corresponds with the relatively high wear zone Z1 of FIG. 12. As indicated in FIGS. 30 and 37, the first body portion 417A has a height H2 near the center of the forefoot region 428, which corresponds with the relatively low wear zone Z4. With this configuration, the first body portion 417A defines a shelf 474A in the relatively high wear region Z1, and slopes downward from the shelf 474A to the relatively low wear region Z4, as shown by intermediate sloped portion 476A. The shelf 474A can extend along the medial side of the first body portion 417A.

Figure 29:
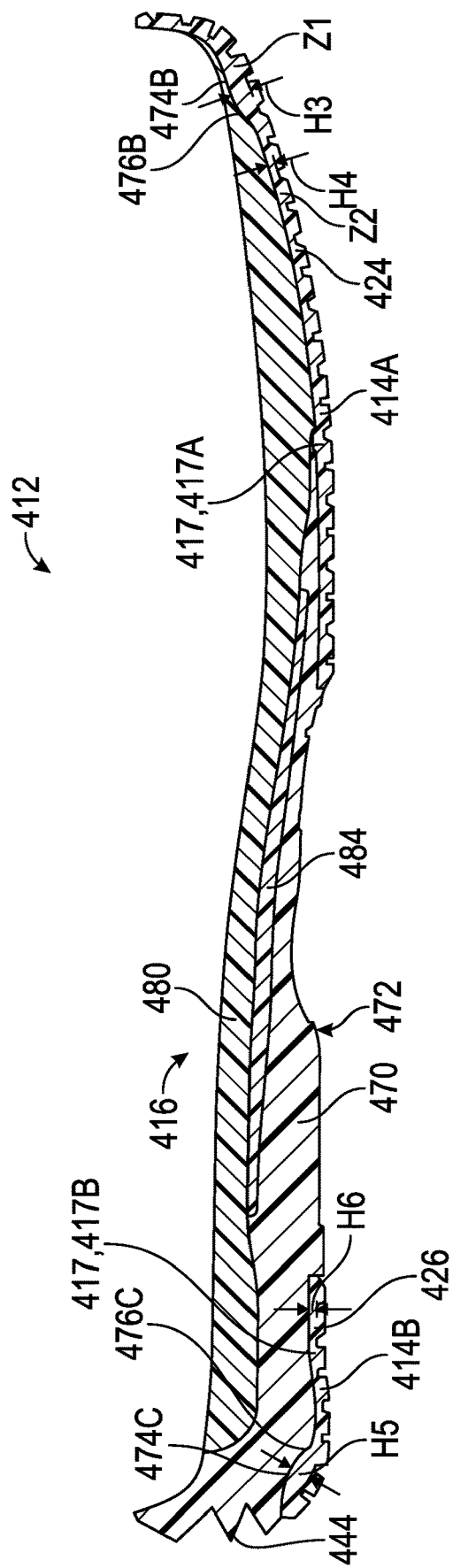
FIG. 29 is a schematic illustration in cross-sectional view of the sole structure of FIGS. 23 and 24 taken at lines 29-29 in FIG. 24.

The shelf configuration of the body 417 is also apparent in FIG. 29. The first body portion 417A has a height H3 near the foremost extent 442 of the forefoot region 428 indicated in FIG. 23, which corresponds with the relatively high wear zone Z1 of FIG. 12. The height H3 may be the same or different than the height H1 of the body portion 417A at the shelf 474A of FIG. 30. The first body portion 417A has a height H4 further inward in the forefoot region 428, which corresponds with wear zone Z2, which is a relatively low wear zone in comparison to wear zone Z1. The height H4 may be the same or different than the height H2 of FIG. 30. With this configuration, the first body portion 417A defines a shelf 474B in the relatively high wear region Z1, and slopes downward from the shelf 474B to the relatively low wear region Z2, as shown by intermediate sloped portion 476B. The shelf 474B can be contiguous with the shelf 474A, and can extend along the outer periphery of the first body portion 417A from the foremost extent of the first body portion 417A and along the lateral side 422.

Additionally, as shown in FIG. 29, the second body portion 417B has a height H5 near the rearmost extent 444 of the sole structure 412 at the heel region 426, which corresponds with the relatively high wear zone Z1 of FIG. 12. The height H5 may be the same or different than the height H1 of the body portion 417A at the shelf 474A of FIG. 30, and the height H3 of the body portion 417A at the shelf 474B of FIG. 29. The second body portion 417B has a height H6 further inward in the heel region 426, which corresponds with wear zone Z2, which is a relatively low wear zone in comparison to wear zone Z1. The height H6 may be the same or different than the height H2 of FIG. 30 and the height H4 of FIG. 29. With this configuration, the second body portion 417B defines a shelf 474C in the relatively high wear region Z1, and slopes downward from the shelf 474C to the relatively low wear region Z2, as shown by intermediate sloped portion 476C. The shelf 474C may extend generally along the outer periphery of the U-shaped second body portion 419B at the medial side 424. Alternatively, the shelf 474C can be generally U-shaped, and can extend along the outer periphery of the U-shaped second body portion 417B at both the medial side 424, the lateral side 422, and along the rear portion of the heel region 426 between the medial side 424 and the lateral side 422.

FIGS. 23 and 35-37 show that each of the tread elements 418 has a front face 452, a rear face 454, and the bottom face 420 that connects the front face 452 and the rear face 454. The front face 452, rear face 454, and bottom face 420 of at least some of the tread elements 418 extend continuously between the lateral side 422 and the medial side 424 as is apparent in FIG. 23. The front face 452 of each tread element 418 is on the generally forward-facing side of the tread element 418, which is the side closer to the forward-most extent 442. The rear face 454 of each tread element 418 is on the generally rearward-facing side of the tread element 418, which is the side closer to the rearward-most extent 444. As is apparent in FIG. 23, the front face 452 and the rear face 454 of each tread element 418 vary in orientation according to the nonlinear shape of the tread element 418.

Referring to FIG. 23, the outsole 414 forms a recess 462 in the first body portion 417A that extends transversely across several of the tread elements 418. The recess 462 is a recession in both the first outsole portion 414A and a stiffening member 484 with the first foam layer 470 as shown in FIG. 30. FIG. 23 also shows that the outsole forms a recess 464 in the second body portion 417B that extends transversely across several of the tread elements 418. The recess 464 is a recession in the second outsole portion 414B. The recesses 462, 464 extend generally longitudinally, and provide increased flexibility. The recesses 462, 464 may be referred to as flex grooves.

Figure 35:
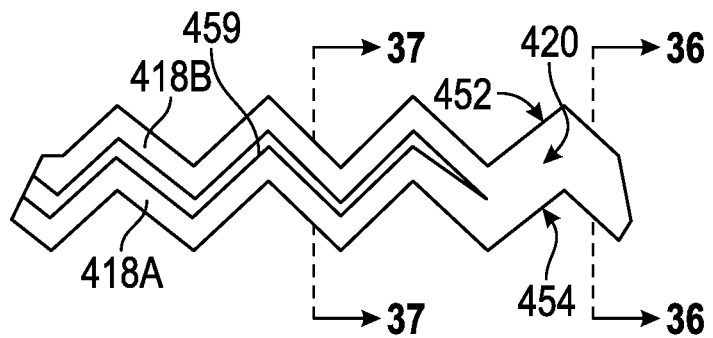
FIG. 35 is a schematic illustration in plan view of one of the tread elements of FIG. 23.

A first set of nonlinear grooves 458 are defined in the outsole 414, each between adjacent ones of the tread elements 418. The nonlinear grooves 458 extend between the medial side 424 and the lateral side 422, and extend completely from the medial side 424 to the lateral side 422 if adjacent those ones of the tread elements 418 that extend completely from the medial side 424 to the lateral side 422. A second set of nonlinear grooves 459 are also defined in the outsole 414, but each of the nonlinear grooves 459 extends only partway between the medial side 424 and the lateral side 422. None of the nonlinear grooves 459 intersect the nonlinear grooves 458. Each nonlinear groove 459 splits or bisects a portion of a respective tread element 418 into a first subtread 418A and a second subtread 418B as best illustrated in FIG. 35. Successive nonlinear grooves 458 remain generally equally spaced from one another when extending transversely between the medial side 424 to the lateral side 422. Each nonlinear groove 459 reduces the width of the bottom surface 420 of the tread element 418 at the subtreads 418A, 418B in comparison to the width W7 of the tread element 418 (shown in FIG. 30) in the portion not split into subtreads 418A, 418B. That is, the sum of the width W8 of the first subtread 418A and the width W9 of the second subtread 418B (shown in FIG. 37) is less than the width W7. By decreasing the width of the tread elements 418 in relatively low wear areas, the second set of nonlinear grooves 459 therefore enable the widths of the tread elements 418 to at least partially correspond with the wear pattern 19.

It should be appreciated that although the tread elements 418 are integrally formed with the body 417 of the outsole 414 in the embodiment shown, the tread elements 418 could instead be separately formed and applied to and secured to the body 417 in other embodiments.

The front face 452 and rear face 454 of each tread element 418 are generally orthogonal to the body 417 of the outsole 414 so that a consistent right angle A7 is formed, and the tread element 418 has a generally rectangular cross-sectional profile in the portion not split by the groove 459, as shown in FIG. 36. Two adjacent generally rectangular shapes are thus formed in the cross-sectional profile of the portion of the tread element 418 split by the groove 459, as shown in FIG. 37. By providing both types of cross-sectional profiles shown in FIGS. 36 and 37, greater durability can be achieved while still providing a desirable amount of grip and traction. That is, a relatively wide portion of the tread element 418 at the relatively high wear area provides increased durability, whereas the relatively thin portion of the tread element in the relatively low wear area, with the groove 459 adjacent thereto, increases grip and traction.

Referring to FIG. 29, the midsole assembly 416 includes the first foam layer 470 with the lower surface 472 to which the outsole 414 is secured. The midsole assembly 416 also has a second foam layer 480 positioned on and partially surrounded by the first foam layer 470. The first and second foam layers 470, 480 can be an EVA or other type of resilient foam. The first foam layer 470 is configured to be a stiffer foam than the second foam layer 480. This provides necessary support around the perimeter of the foot, while providing comfort and cushioning more immediately adjacent the foot.

Figure 32:
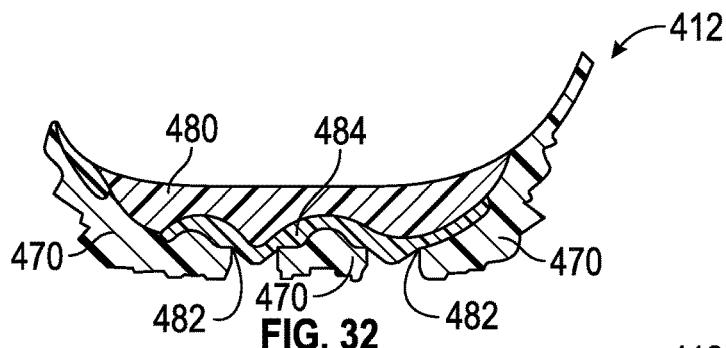
FIG. 32 is a schematic illustration in cross-sectional view of the sole structure of FIGS. 23 and 24 taken at lines 32-32 in FIG. 24.
Figure 33:
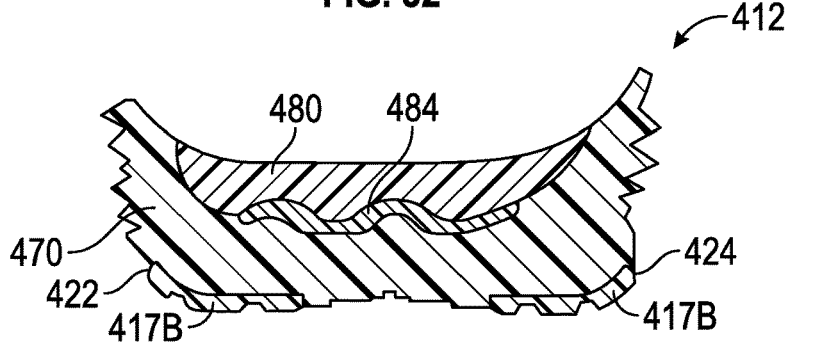
FIG. 33 is a schematic illustration in cross-sectional view of the sole structure of FIGS. 23 and 24 taken at lines 33-33 in FIG. 24.
Figure 34:
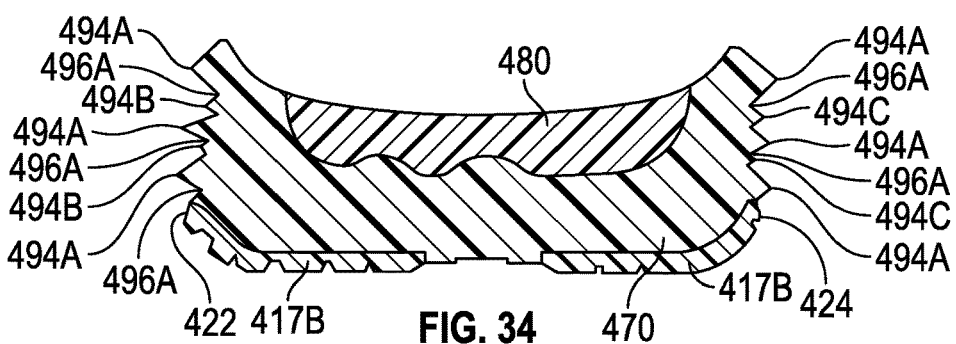
FIG. 34 is a schematic illustration in cross-sectional view of the sole structure of FIGS. 23 and 24 taken at lines 34-34 in FIG. 24.

As best shown in FIGS. 23 and 32, the first foam layer 470 has a pair of slots 482 extending through the first foam layer 470 in the exposed area of the midfoot region 427. The midsole assembly 416 also includes a stiffening member 484 positioned between the first foam layer 470 and the second foam layer 480. The stiffening member 484 has ribs 486 that extend through the slots 482 of the first foam layer 470 so that the ribs 486 are partially exposed. The stiffening member 484 and the ribs 486 are stiffer than the first foam layer 470 and the second foam layer 480. The stiffening member 484 and ribs 486 can be a thermoplastic polyurethane material. The stiffening member 484 and ribs 486 provide increased support in the midfoot region 427. The stiffening member 484 also extends partially into the forefoot region 428, as indicated by FIG. 30, and into the heel region 426 as indicated by FIG. 33. As shown in FIGS. 24-26 and 31, the midsole assembly 416 also includes a lip 488 extending upward along a portion of the lateral side 422 of the first foam layer 470. The lip 488 is stiffer than the first foam layer 470. For example, the lip 488 can be a thermoplastic polyurethane material.

With reference to FIGS. 25 and 26, the first foam layer 470, also referred to as a resilient component, has a heel region 490 and a peripheral surface 492 that extends around the heel region 490 and has a lateral side and a medial side extending along the lateral side 422 and the medial side 424, respectively. The first foam layer 470 is molded or otherwise formed so that the peripheral surface 492 has a first set of alternating ridges 494A and grooves 496A extending longitudinally forward from the heel region 490 to a first set of tapered ends 498A.

As shown in FIG. 25, the first foam layer 470 is also molded or otherwise formed so that the peripheral surface 492 has a second set of alternating ridges 494B and grooves 496B interleaved with the first set of alternating ridges 494A and grooves 496A on the lateral side 422. Tapered ends 498B of the second set of ridges 494B and grooves 496B are rearward of the tapered ends 498A. The tapered ends 498B are referred to herein as a second set of tapered ends. As shown in FIG. 25, a portion of the second layer 480 extends at least partially forward of the first layer 470. Some of the alternating ridges and grooves 494B, 496B continue in the portion of the second layer 480 that extends forward of the first layer 470, so at least some of other tapered ends 498C of the second set of ridges 494B (i.e., ends opposite the tapered ends 498B) and grooves 496B are formed in the peripheral surface of the second layer 480. As shown in FIG. 26, the peripheral surface 492 of the first foam layer 470 is also molded or otherwise formed so that a third set of alternating ridges 494C and grooves 496C are interleaved with the first set of ridges 494A and grooves 496A on the medial side 424.

With the peripheral surface 492 of the first foam layer 470 configured as described with various sets of interleaved ridges and grooves, the peripheral surface resembles an accordion shape with a series of pleats and folds. During use, the resilient material of the first and second foam layers 470, 480 allows the ridges 494A, 494B, 494C to compress under loads and spring back to the extended positions shown in the drawings. The interleaved construction of the sets of ridges and grooves provides resiliency in the heel region 426 and the midfoot region 427. The larger ridges 494A in the heel region 490 allow increased energy absorbing and resilient compression under load. The tapering of the ridges 494A at the midfoot region 427 results in relatively less compression under load, and greater support, in the midfoot region 427.

The outsole 414 and midsole assembly 416 can be secured to one another by thermoforming during a molding process, by thermoplastic layers that melt to bond the components, by adhesives, or by any other suitable manner. A footwear upper (not shown) is secured in any suitable manner to the sole structure 412. More specifically and with reference to FIG. 24, a footwear upper and strobel unit can be secured to a foot-receiving surface 436 of the second foam layer 480, an inner peripheral surface 438 of the outsole 414 near the forefoot region 428, and to an inner peripheral surface 440 of the midsole assembly 416.

The method 300 of FIG. 22 may be carried out to manufacture the article of footwear 410. The wear pattern 19 of an outsole can be determined in step 302 and then, in step 304, the outsole 414 can be designed to be manufactured so that widths of different portions of tread elements 418 at a ground contact surface of the outsole 414 are correlated with the different wear regions of the wear pattern 19, as discussed with respect to FIG. 23. Under the method 300, the height of the body 417 of the outsole 414 can also be designed to vary with the predetermined wear pattern 19, so that a relatively high wear area has a height greater than a relatively low wear area, creating a wear shelf 476A, 476B, 476C, as described with respect to FIGS. 29 and 30. In step 306, an outsole 414 is then formed according to the widths determined in step 304 and the heights determined as described with respect to FIGS. 29 and 30. Steps 302 and 304 can be performed by the same entity performing step 306, or by a separate entity. If step 306 is performed by a separate entity than the entity performing steps 302 and 304, information regarding specific dimensions of the widths and heights can be provided to the entity carrying out step 306, such as in the form of design specifications or mold specifications if the outsole is to be molded with the tread elements.

Forming the outsole in step 306 is done so that at least some of the tread elements 418 extend from the lateral side 422 to the medial side 424 of the outsole, and so that portions of bottom faces 420 of at least some of the tread elements 418 correlated with a relatively high wear region, such as wear zone Z1 of the wear pattern 19, are wider than portions of the bottom faces of the tread elements 418 correlated with a relatively low wear region of the wear pattern 19, such as wear zone Z2, Z3, or Z4.

Forming the outsole in step 306 may include sub-step 308, molding the outsole so that the body portions 417A, 417B and the tread elements 418 are integrally molded, as in the embodiment of FIG. 23. A mold assembly with mold cavities configured to provide the shape of the tread elements 418 would be used in sub-step 308. Alternatively, the body portions 417A, 417B of the outsole 414 can be molded, and the tread elements 418 could be separately molded or otherwise formed. The tread elements 418 can then be attached to the body portions 417A, 417B by bonding, adhesives, or any other suitable manner.

Accordingly, an article of footwear 10 or 410 is provided according to the method 300 with an outsole 14, 114, 214, or 414 configured for superior durability and abrasion resistance due to the configuration of the tread elements having portions with different widths corresponding to expected wear regions of the outsole, as determined by a wear map. With respect to the outsole 414, the different heights of body portions 417A, 417B corresponding with the wear map 19 also contribute to increased durability and abrasion resistance.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A sole structure for an article of footwear, the sole structure comprising:
an outsole having: a body with a lateral side and a medial side;
a plurality of tread elements extending from the body to establish a ground contact surface;
a midsole assembly having a first layer, the first layer defining a lower surface, and the outsole being attached to the lower surface:
wherein at least two of the tread elements extend between the lateral side and the medial side and each include a front face, a rear face, and a bottom face that connects the front face and the rear face; and
wherein the body of the outsole is divided into a first body portion and a second body portion; wherein the first body portion is discontinuous from the second body portion; wherein the first layer has slots exposed between the first body portion and the second body portion; and wherein the midsole assembly has ribs extending through the slots;
wherein the outsole has a heel region and a forefoot region; and wherein the first body portion is disposed at the forefoot region and the second body portion is disposed at the heel region.

2. The sole structure of claim 1, wherein a plurality of first nonlinear grooves is defined in the outsole;
wherein the first nonlinear grooves extend from the lateral side to the medial side and separate adjacent ones of the tread elements;
wherein a plurality of second nonlinear grooves is defined in the outsole; and
wherein the second nonlinear grooves extend only partway between the lateral side and the medial side without intersecting the first nonlinear grooves to thereby split each of said at least two of the tread elements into a first subtread and second subtread.

3. The sole structure of claim 1,
wherein a portion of the lower surface of the midsole assembly is exposed between the first body portion and the second body portion of the outsole.

4. The sole structure of claim 3,
wherein the ribs are stiffer than the first layer.

5. The sole structure of claim 1, wherein the outsole has a recess traversing multiple ones of the tread elements that extend from the first body portion.

6. The sole structure of claim 1, wherein the second body portion is generally U-shaped.

7. The sole structure of claim 1, wherein the outsole has a recess traversing multiple ones of the tread elements that extend from the second body portion.

8. The sole structure of claim 1, wherein the outsole has a generally high wear region and a generally low wear region adjacent the generally high wear region; and
wherein a height of the body above the tread elements is greater in the generally high wear region than in the generally low wear region.

9. The sole structure of claim 8, wherein the body defines a shelf in the generally high wear region; and
wherein the body slopes downward from the shelf to the generally low wear region.

10. The sole structure of claim 1, wherein a plurality of first nonlinear grooves is defined in the outsole; wherein the first nonlinear grooves extend continuously from the lateral side to the medial side and separate adjacent ones of the tread elements; and
wherein a plurality of second nonlinear grooves is defined in the outsole; and wherein the second nonlinear grooves extend only partway between the lateral side and the medial side without intersecting the first nonlinear grooves.

11. A sole structure for an article of footwear, the sole structure comprising:
an outsole having:
a body with a lateral side and a medial side;
a plurality of tread elements extending from the body to establish a ground contact surface;
wherein at least two of the tread elements extend between the lateral side and the medial side and each include a front face, a rear face, and a bottom face that connects the front face and the rear face; and wherein the sole structure further comprises a midsole assembly having a resilient component with a lower surface;

wherein the outsole is attached to the lower surface of the resilient component;

wherein the resilient component has a peripheral surface with a heel region;

wherein the peripheral surface has a plurality of first alternating ridges and grooves extending longitudinally forward from the heel region to a plurality of first tapered ends; and wherein the resilient component has a plurality of second alternating ridges and grooves interleaved with the first alternating ridges and grooves.

12. The sole structure of claim 11, wherein the resilient component is a first layer;

wherein the midsole assembly has a second layer positioned on and partially surrounded by the first layer;

wherein a portion of the second layer extends at least partially forward of the first layer; and wherein at least some of the first and second alternating ridges and continue in the portion of the second layer that extends at least partially forward of the first layer.

13. A sole structure for an article of footwear, the sole structure comprising:

an outsole having:
a body with a lateral side and a medial side;
a plurality of tread elements extending from the body to establish a ground contact surface;
wherein at least two of the tread elements extend between the lateral side and the medial side and each include a front face, a rear face, and a bottom face that connects the front face and the rear face; and wherein the sole structure further comprises a midsole assembly;

the midsole assembly including a first foam layer, the first foam layer defining a lower surface, wherein the first foam layer has slots, and the outsole is attached to the lower surface;

the midsole assembly including a second foam layer positioned on and partially surrounded by the first foam layer, wherein the first foam layer is stiffer than the second foam layer; and wherein the midsole assembly includes a stiffening member positioned between the first foam layer and the second foam layer, and the stiffening member has ribs that extend through the slots of the first foam layer so that the ribs are partially exposed.

14. The sole structure of claim 13, wherein the ribs are stiffer than the first foam layer;

wherein the sole structure comprises a lip extending from the first foam layer; and wherein the lip is stiffer than the first foam layer.

15. The sole structure of claim 13, wherein the stiffening member and the ribs are stiffer than the first foam layer and the second foam layer, and the stiffening member also extends partially into a forefoot region of the outsole.

* * * * *